(12) United States Patent
Huang et al.

(10) Patent No.: US 12,455,643 B2
(45) Date of Patent: *Oct. 28, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Weiyun Huang, Beijing (CN); Longhui Xue, Beijing (CN); Yue Long, Beijing (CN); Wei Zhang, Beijing (CN); Xingliang Xiao, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/340,135

(22) Filed: Jun. 23, 2023

(65) Prior Publication Data

US 2023/0333684 A1 Oct. 19, 2023

Related U.S. Application Data

(63) Continuation-in-part of application No. 17/993,046, filed on Nov. 23, 2022, which is a continuation of (Continued)

(30) Foreign Application Priority Data

Dec. 20, 2019 (CN) .......................... 201911333470.9

(51) Int. Cl.
G06F 3/041 (2006.01)
(52) U.S. Cl.
CPC .. G06F 3/0412 (2013.01); *G06F 2203/04102* (2013.01)

(58) Field of Classification Search
None
See application file for complete search history.

(56) References Cited

U.S. PATENT DOCUMENTS 10,222,662 B2 3/2019 Shi
10,338,710 B2 7/2019 Li et al.
(Continued)

FOREIGN PATENT DOCUMENTS

CN 104866161 A 8/2015
CN 105511688 A 4/2016
(Continued)

OTHER PUBLICATIONS

Office Action dated Oct. 31, 2023, issued in counterpart CN Application No. 202310418030.3, with English translation. (13 pages).

(Continued)

*Primary Examiner* — Brian M Butcher
(74) *Attorney, Agent, or Firm* — WHDA, LLP

(57) ABSTRACT

A display panel includes: a base substrate, a pixel driving circuit layer in a second display region of the base substrate, a plurality of light emitting elements and a touch function layer at least in the second display region. A pixel driving circuit trace of the pixel driving circuit layer includes a plurality of first traces extending in a first direction and a plurality of second traces extending in a second direction intersecting the first direction. A first slit is between two adjacent first traces and a second slit is between two adjacent second traces. At least one of an orthographic projection of the first slit on the base substrate and an orthographic projection of the second slit on the base substrate at least partially overlaps with an orthographic projection of the touch function layer on the base substrate.

19 Claims, 17 Drawing Sheets

Related U.S. Application Data application No. 16/905,108, filed on Jun. 18, 2020, now Pat. No. 11,543,903.

(56) References Cited

U.S. PATENT DOCUMENTS

| | | |
|---|---|---|
| 10,712,855 B2 | 7/2020 | Ma et al. |
| 10,756,136 B1 | 8/2020 | Ma et al. |
| 11,216,099 B2 | 1/2022 | Zhang et al. |
| 11,249,569 B2 | 2/2022 | Ye |
| 11,543,903 B2 | 1/2023 | Huang et al. |
| 12,073,037 B2 | 8/2024 | Huang et al. |
| 2012/0120020 A1 | 5/2012 | Lee |
| 2014/0085214 A1 | 3/2014 | Cok |
| 2014/0312321 A1 | 10/2014 | Yoo et al. |
| 2017/0220148 A1 | 8/2017 | Zhou et al. |
| 2019/0050100 A1 | 2/2019 | Ma et al. |
| 2019/0081118 A1 | 3/2019 | Oh et al. |
| 2019/0179466 A1 | 6/2019 | Kim et al. |
| 2019/0187844 A1 | 6/2019 | Ye |
| 2019/0204964 A1 | 7/2019 | Wang et al. |
| 2020/0379295 A1 | 12/2020 | Wei et al. |
| 2021/0011571 A1 | 1/2021 | Zhang et al. |
| 2023/0081895 A1* | 3/2023 | Huang .................. G06F 3/0445 345/173 |

FOREIGN PATENT DOCUMENTS

| | | |
|---|---|---|
| CN | 205670226 U | 11/2016 |
| CN | 108054193 A | 5/2018 |
| CN | 207780741 U | 8/2018 |
| CN | 108628047 A | 10/2018 |
| CN | 110061014 A | 7/2019 |
| CN | 110164951 A | 8/2019 |
| CN | 110349976 A | 10/2019 |
| KR | 20170139486 A | 12/2017 |

OTHER PUBLICATIONS

Non-Final Office Action dated Dec. 6, 2023, issued in U.S. Appl. No. 17/993,046 (11 pages).

Office Action dated May 7, 2022, issued in counterpart CN application No. 201911333470.9, with English translation. (18 pages).

Non-Final Office Action dated Oct. 27, 2021, issued in U.S. Appl. No. 16/905,108 (11 pages).

Final Office Action dated Feb. 17, 2022, issued in U.S. Appl. No. 16/905,108 (11 pages).

Notice of Allowance dated Sep. 7, 2022, issued in U.S. Appl. No. 16/905,108 (11 pages).

Non-Final Office Action dated Mar. 14, 2023, issued in U.S. Appl. No. 17/993,046 (27 pages).

Non-Final Office Action dated Jan. 30, 2025, issued in U.S. Appl. No. 18/762,768 (24 pages).

* cited by examiner

DISPLAY PANEL AND DISPLAY DEVICE

CROSS-REFERENCE TO RELATED APPLICATION

This application is a continuation-in-part application of U.S. patent application Ser. No. 17/993,046 filed on Nov. 23, 2022, which is a continuation application of U.S. patent application Ser. No. 16/905,108 filed on Jun. 18, 2020, now U.S. Pat. No. 11,543,903, which claims priority to Chinese Patent Application No. 201911333470.9 filed on Dec. 20, 2019 in China National Intellectual Property Administration, the disclosure of which is incorporated herein by reference in entirety.

TECHNICAL FIELD

Embodiments of the present disclosure relate to the field of display technology, and in particular, to a display panel and a display device.

BACKGROUND

With the development of technology, the market demand for display panels with high screen-to-body ratios is becoming more and more urgent, and display panels are developing towards full-screen, thin and light products. The full-screen display panel cannot be achieved without the in-screen camera technology, that is, the camera is located right below the display panel. When the imaging function is not required, the display panel in the camera region emits light normally as other regions of the display panel. When the imaging function is required, the camera region has the normal imaging function.

SUMMARY

In an aspect of the present disclosure, a display panel is provided, including: a base substrate, the base substrate includes a first display region and a second display region located at least on a side of the first display region, the second display region includes a plurality of light transmitting regions and a plurality of pixel cell regions, and at least one pixel cell region in the plurality of pixel cell regions includes a plurality of sub-pixels; a pixel driving circuit layer located on a side of the base substrate and at least in the second display region, the pixel driving circuit layer includes a pixel driving circuit and a pixel driving circuit trace electrically connected to the pixel driving circuit, the pixel driving circuit trace includes a plurality of first traces extending in a first direction and a plurality of second traces extending in a second direction intersecting the first direction, and a first slit is between two adjacent first traces and a second slit is between two adjacent second traces; a plurality of light-emitting elements located in the second display region and on a side of the pixel driving circuit layer away from the base substrate, and the light-emitting element includes an anode, a light-emitting layer, and a cathode stacked sequentially; and a touch function layer located on a side of the plurality of light emitting elements away from the base substrate and at least in the second display region, and at least one of an orthographic projection of the first slit on the base substrate and an orthographic projection of the second slit on the base substrate at least partially overlaps with an orthographic projection of the touch function layer on the base substrate.

According to the embodiment of the present disclosure, the touch function layer includes a plurality of first touch electrodes extending in the first direction, and a plurality of second touch electrodes extending in the second direction; an orthographic projection of the first touch electrode at least partially covers the orthographic projection of the first slit on the base substrate; and an orthographic projection of the second touch electrode at least partially covers the orthographic projection of the second slit on the base substrate.

According to the embodiment of the present disclosure, the first touch electrode winds at least partially around an edge of at least one sub-pixel in the plurality of sub-pixels; or the second touch electrode winds at least partially around an edge of at least one sub-pixel in the plurality of sub-pixels.

According to the embodiment of the present disclosure, the plurality of sub-pixels includes a first sub-pixel, a second sub-pixel and a third sub-pixel, the first sub-pixel and the second sub-pixel are arranged in the second direction, and the third sub-pixel is located on a side of the first sub-pixel and the second sub-pixel along the first direction.

According to the embodiment of the present disclosure, the first touch electrode winds at least partially around edges of the first sub-pixel and the second sub-pixel; or the first touch electrode winds at least partially around an edge of the third sub-pixel.

According to the embodiment of the present disclosure, the first touch electrode winds at least partially around the edges of the first sub-pixel and the second sub-pixel, and the second touch electrode winds at least partially around the edge of the third sub-pixel.

According to the embodiment of the present disclosure, the orthographic projection of the first touch electrode on the base substrate and the orthographic projection of the second touch electrode on the base substrate do not overlap with an orthographic projection of a light emitting region of the light emitting element on the base substrate.

According to the embodiment of the present disclosure, the orthographic projection of the touch function layer does not overlap with an orthographic projection of the anode on the base substrate.

According to the embodiment of the present disclosure, a third slit is between adjacent sub-pixels, and the orthographic projection of the touch function layer on the base substrate overlaps with an orthographic projection of the third slit on the base substrate.

According to the embodiment of the present disclosure, the touch function layer includes a plurality of first touch electrodes extending in the first direction and a plurality of second touch electrodes extending in the second direction, the third slit includes a first sub-slit, a second sub-slit and a third sub-slit, and each of the first sub-slit, the second sub-slit and the third sub-slit is located between adjacent sub-pixels, the first touch electrode includes a first winding by winding at least partially around the edges of the first sub-pixel and the second sub-pixel, an orthographic projection of the first winding of the first touch electrode overlaps with orthographic projections of the first sub-slit and the second sub-slit connected to each other on the base substrate, or the orthographic projection of the first winding of the first touch electrode overlaps with orthographic projections of the first sub-slit and the third sub-slit connected to each other on the base substrate; and the second touch electrode includes a second winding by winding at least partially around the edge of the third sub-pixel, and an orthographic projection of the second winding of the second touch electrode overlaps with orthographic projections of the second sub-slit and the third sub-slit connected to each other on the base substrate.

According to the embodiment of the present disclosure, the orthographic projection of the first touch electrode on the base substrate covers the orthographic projection of the first slit on the base substrate, and an area of the orthographic projection of the first touch electrode on the base substrate is smaller than a sum of an area of the orthographic projection of the first slit on the base substrate and areas of orthographic projections of two first traces adjacent on two sides of the first slit on the base substrate.

According to the embodiment of the present disclosure, the orthographic projection of the second touch electrode on the base substrate covers the orthographic projection of the second slit on the base substrate, and an area of the orthographic projection of the second touch electrode on the base substrate is smaller than a sum of an area of the orthographic projection of the second slit on the base substrate and areas of orthographic projections of two second traces adjacent on two sides of the second slit on the base substrate.

According to the embodiment of the present disclosure, the plurality of first traces are configured to transmit a data signal and a power voltage signal to the plurality of sub-pixels.

According to the embodiment of the present disclosure, the plurality of second traces are configured to transmit a scan signal and a light emitting control signal to the plurality of sub-pixels.

According to the embodiment of the present disclosure, a density of the sub-pixels in the first display region is greater than a density of the sub-pixels in the second display region.

According to the embodiment of the present disclosure, a light transmittance of the first display region is smaller than a light transmittance of the second display region.

According to the embodiment of the present disclosure, the touch function layer includes a plurality of first touch structures, a plurality of second touch structures, and a plurality of third touch structures; the plurality of first touch structures extend in the first direction; the plurality of second touch structures extend in the second direction; the plurality of third touch structures respectively correspond to the plurality of pixel cell regions, the third touch structure includes a plurality of sub-parts, the plurality of sub-parts of each third touch structure respectively surround the plurality of sub-pixels in the pixel cell region corresponding to the third touch structure; the third touch structures corresponding to two pixel cell regions adjacent in the first direction are electrically connected through the first touch structure; and the third touch structures corresponding to two pixel cell regions adjacent in the second direction are electrically connected through the second touch structure.

According to the embodiment of the present disclosure, the first touch structure, the second touch structure and the third touch structure are located on a same layer.

According to the embodiment of the present disclosure, a width of the first touch structure in the first direction and a width of the second touch structure in the second direction are greater than a line width of each grid in the third touch structure.

In another aspect of the present disclosure, a display device is provided, including: the display panel described above; and a sensor unit arranged in the second display region of the display panel and located on a side of the base substrate facing away from a light emitting direction, a photosensitive surface of the sensor unit faces the display panel.

BRIEF DESCRIPTION OF THE DRAWINGS

Other features, purposes, and advantages of the present disclosure will become more apparent by reading the detailed description of the non-limiting embodiments made with reference to the following drawings.

DETAILED DESCRIPTION OF EMBODIMENTS

Figure 1:
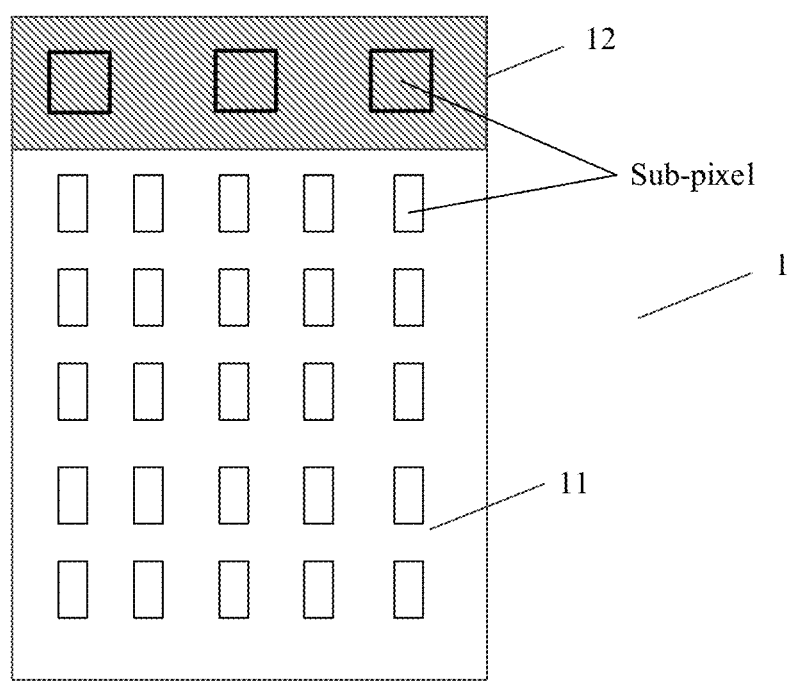
FIG. 1 is a schematic structural diagram of a display panel according to an embodiment of the present disclosure.

The present disclosure will be further described in detail below with reference to the drawings and embodiments. It can be understood that the specific embodiments described herein are only used to explain the present disclosure, rather than limiting the present disclosure. It should also be noted that, for ease of description, only the parts related to the present disclosure are shown in the drawings.

It should be noted that the embodiments and the features in the embodiments of the present disclosure may be combined with each other without conflict. The present disclosure will be described in detail below with reference to the drawings and in conjunction with the embodiments.

In the in-screen camera technology, the camera region requires a high light transmittance due to its imaging function, while the light transmittance of the normal light emitting region is far from meeting the needs of the camera. To this end, a "H+L" design is adopted, that is, the normal region uses a high PPI design, and the camera region uses a low PPI design. The light transmittance at the pixel cell is lower, and the light transmittance at the blank region between the pixels is higher. Therefore, the light transmittance of the low PPI region is higher, thereby the light transmittance of the camera region may be improved.

In addition, when the imaging and display functions are combined, the slits between signal traces in the display region will affect the imaging quality of the camera.

The embodiments of the present disclosure are expected to provide a display panel and a display device to improve the imaging quality of the imaging and the multiplexing region for imaging and displaying.

Referring to FIG. 1, FIG. 1 is a schematic structural diagram of a display panel according to an embodiment of the present disclosure.

The display panel 1 includes a first display region 11 and a second display region 12, the first display region 11 and the second display region 12 respectively include a plurality of pixel cell regions. Each pixel cell region includes at least one pixel cell, and the pixel cell includes a plurality of sub-pixels. For example, each pixel cell includes a red sub-pixel (R), a green sub-pixel (G) and a blue sub-pixel (B). A density of the pixel cells in the first display region 11 is greater than a density of the pixel cells in the second display region 12. That is, the number of the pixel cells per unit area in the first display region 11 is greater than the number of the pixel cells per unit area in the second display region 12, or an area of the pixel cells in a unit area in the first display region 11 is greater than an area of the pixel cells in a unit area in the second display region 12. The second display region 12 is as shown in FIG. 1, and the second display region 12 may be rectangular, circular, or the like. In an embodiment, the second display region 12 is provided as a circle.

In an embodiment of the present disclosure, a density of the sub-pixels in the first display region 11 is greater than a density of the sub-pixels in the second display region 12. That is, the number of the sub-pixels per unit area in the first display region 11 is greater than the number of the sub-pixels per unit area in the second display region 12, or a total area of the sub-pixels in a unit area in the first display region 11 is greater than a total area of the sub-pixels in a unit area in the second display region 12.

Figure 2:
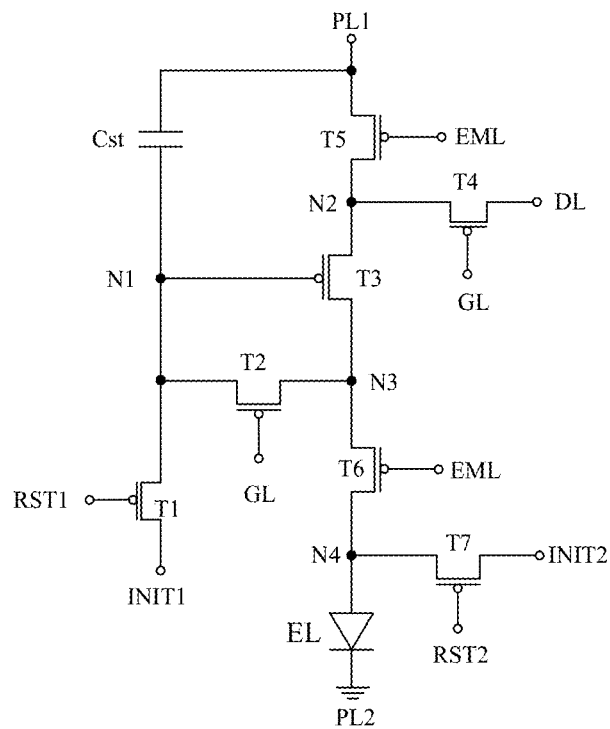
FIG. 2 is an equivalent circuit diagram of a pixel driving circuit of a sub-pixel of the display panel provided in FIG. 1.
Figure 3:
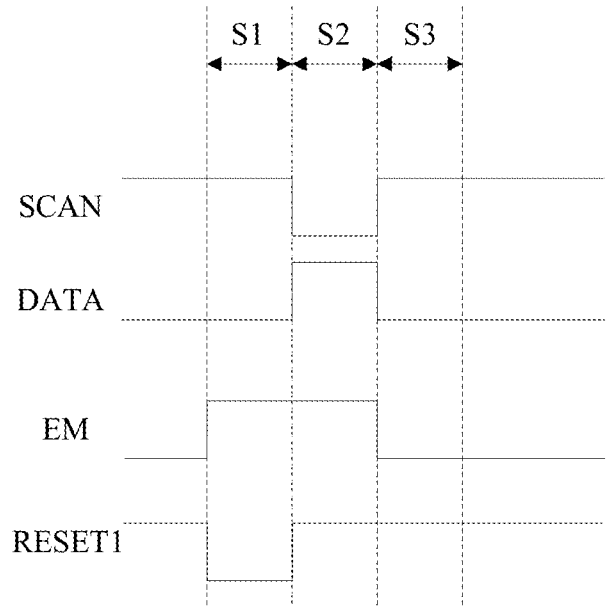
FIG. 3 is a working timing diagram of the pixel driving circuit provided in FIG. 2.

FIG. 2 is an equivalent circuit diagram of a pixel driving circuit of a sub-pixel of the display panel provided in FIG. 1. FIG. 3 is a working timing diagram of the pixel driving circuit provided in FIG. 2. The pixel driving circuit of the exemplary embodiment is described by taking a 7T1C structure as an example. However, the present disclosure is not limited thereto.

In some exemplary embodiments, as shown in FIG. 2, the pixel driving circuit may include switching transistors T1, T2, and T4 to T7, a drive transistor T3, and a storage capacitor Cst. The switching transistors T1, T2, and T4 to T7 are respectively a data writing transistor T4, a threshold compensation transistor T2, a first light emitting control transistor T5, a second light emitting control transistor T6, a first reset transistor T1, and a second reset transistor T7. A light emitting element EL may include an anode, a cathode, and an organic light emitting layer disposed between the anode and the cathode.

In some exemplary embodiments, the drive transistor T3 and the switching transistors T1, T2, and T4 to T7 may be P-type transistors or may be N-type transistors. Adopting a same type of transistors in the pixel driving circuit may simplify a process flow, reduce a process difficulty of the display panel and improve a yield of products. In some exemplary embodiments, the drive transistor T3 and the switching transistors T1, T2, and T4 to T7 may include a P-type transistor and an N-type transistor.

In some exemplary embodiments, a low temperature poly-silicon thin film transistor, or an oxide thin film transistor, or a low temperature poly-silicon thin film transistor together with an oxide thin film transistor may be adopted for the drive transistor T3 and the switching transistors T1, T2, and T4 to T7. An active layer of the low temperature poly-silicon thin film transistor is made of a Low Temperature Poly-Silicon (LTPS), and an active layer of the oxide thin film transistor is made of an oxide semiconductor (Oxide). The low temperature poly-silicon thin film transistor has advantages such as high mobility and fast charging, and the oxide thin film transistor has advantages such as low leakage current. The low temperature poly-silicon thin film transistor and the oxide thin film transistor are integrated on an display panel to form a Low Temperature Polycrystalline Oxide (LTPO) display panel, thus advantages of the two may be utilized, thereby achieving low frequency driving, reducing a power consumption, and improving a display quality.

In some exemplary embodiments, as shown in FIG. 2, the display panel may include a scan line GL, a data line DL, a first power supply line PL1, a second power supply line PL2, a light emitting control line EML, a first initial signal line INIT1, a second initial signal line INIT2, a first reset control line RST1, and a second reset recontrol line RST2. In some examples, the first power supply line PL1 may be configured to provide a constant first voltage signal VDD to the pixel driving circuit, the second power supply line PL2 may be configured to provide a constant second voltage signal VSS to the pixel driving circuit, and the first voltage signal VDD is greater than the second voltage signal VSS. The scan line GL may be configured to provide a scan signal SCAN to the pixel driving circuit, the data line DL may be configured to provide a data signal DATA to the pixel driving circuit, the light emitting control line EML may be configured to provide a light emitting control signal EM to the pixel driving circuit, the first reset control line RST1 may be configured to provide a first reset control signal RESET1 to the pixel driving circuit, and the second reset control line RST2 may be configured to provide a second reset control signal RESET2 to the pixel driving circuit. In some examples, in the pixel driving circuit of a z-th row, the first reset control line RST1 may be electrically connected to the scan line GL of the pixel driving circuit of a (z−1)-th row so as to be input with the scan signal SCAN(z−1), that is, the first reset control signal RESET1(z) is the same as the scan signal SCAN(z−1). The second reset control line RST2 may be electrically connected to the scan line GL of the pixel driving circuit of the z-th row so as to be input with the scan signal SCAN(z), that is, the second reset control signal RESET2(z) is the same as the scan signal SCAN(z). In some examples, the second reset control line RST2 to which the pixel driving circuit of the z-th row is electrically connected, and the first reset control line RST1 to which the pixel driving circuit of the (z+1)-th row is electrically connected may be of an integral structure. Among them, z is an integer greater than 0. In this way, signal lines of the display panel may be reduced, and a narrow bezel design of the display panel may be achieved. However, the present disclosure is not limited thereto.

In some exemplary embodiments, the first initial signal line INIT1 may be configured to provide a first initial signal to the pixel driving circuit, the second initial signal line INIT2 may be configured to provide a second initial signal to the pixel driving circuit. For example, the first initial signal may be different from the second initial signal. The first initial signal and the second initial signal may be constant voltage signals, and their magnitudes, for example, may be between the first voltage signal VDD and the second voltage signal VSS. However, the present disclosure is not limited thereto. In other examples, the first initial signal and the second initial signal may be the same, and only the first initial signal line may be disposed to provide the first initial signal.

In some exemplary embodiments, as shown in FIG. 2, the drive transistor T3 is electrically connected to the light emitting element EL, and is configured to output a drive current to drive the light emitting element EL to emit light under a control of the scan signal SCAN, the data signal DATA, the first voltage signal VDD, the second voltage signal VSS and etc. A gate of the data writing transistor T4 is electrically connected to the scan line GL, a first electrode of the data writing transistor T4 is electrically connected to the data line DL, and a second electrode of the data writing transistor T4 is electrically connected to a first electrode of the drive transistor T3. A gate of the threshold compensation transistor T2 is electrically connected to the scan line GL, a first electrode of the threshold compensation transistor T2 is electrically connected to a gate of the drive transistor T3, and a second electrode of the threshold compensation transistor T2 is electrically connected to a second electrode of the drive transistor T3. A gate of a first light emitting control transistor T5 is electrically connected to the light emitting control line EML, a first electrode of the first light emitting control transistor T5 is electrically connected to the first power supply line PL1, and a second electrode of the first light emitting control transistor T5 is electrically connected to the first electrode of the drive transistor T3. A gate of the second light emitting control transistor T6 is electrically connected to the light emitting control line EML, a first electrode of the second light emitting control transistor T6 is electrically connected to the second electrode of the drive transistor T3, and a second electrode of the second light emitting control transistor T6 is electrically connected to an anode of the light emitting element EL. The first reset transistor T1 is electrically connected to the gate of the drive transistor T3 and is configured to reset the gate of the drive transistor T3, and the second reset transistor T7 is electrically connected to the anode of the light emitting element EL and is configured to reset the anode of the light emitting element EL. A gate of the first reset transistor T1 is electrically connected to the first reset control line RST1, a first electrode of the first reset transistor T1 is electrically connected to the first initial signal line INIT1, and a second electrode of the first reset transistor T1 is electrically connected to the gate of the drive transistor T3. A gate of the second reset transistor T7 is electrically connected to the second reset control line RST2, a first electrode of the second reset transistor T7 is electrically connected to the second initial signal line INIT2, and a second electrode of the second reset transistor T7 is electrically connected to the anode of the light emitting element EL. A first capacitor plate of a storage capacitor Cst is electrically connected to the gate of the drive transistor T3, and a second capacitor plate of the storage capacitor Cst is electrically connected to the first power supply line PL1.

In the embodiment, a first node N1 is a connection point of the storage capacitor Cst, the first reset transistor T1, the drive transistor T3, and the threshold compensation transistor T2, a second node N2 is a connection point of the first light emitting control transistor T5, the data writing transistor T4, and the drive transistor T3, a third node N3 is a connection point of the drive transistor T3, the threshold compensation transistor T2, and the second light emitting control transistor T6, and a fourth node N4 is a connection point of the second light emitting control transistor T6, the second reset transistor T7, and the light emitting element EL.

A working process of the pixel driving circuit illustrated in FIG. 2 will be described below with reference to FIG. 3. Description is given by taking a case in which a plurality of transistors included in the pixel driving circuit shown in FIG. 2 are all P-type transistors as an example.

In some exemplary embodiments, as shown in FIG. 3, during one-frame display time period, the working process of the pixel driving circuit may include a first stage S1, a second stage S2, and a third stage S3.

The first stage S1 is referred to as a reset stage. The first reset control signal RESET1 provided by the first reset control line RST1 is a low-level signal, so that the first reset transistor T1 is turned on, and the first initial signal provided by the first initial signal line INIT1 is provided to the first node N1 to initialize the first node N1 and clear an original data voltage in the storage capacitor Cst. The scan signal SCAN provided by the scan line GL is a high-level signal, and the light emitting control signal EM provided by the light emitting control line EML is a high-level signal, so that the data writing transistor T4, the threshold compensation transistor T2, the first light emitting control transistor T5, the second light emitting control transistor T6, and the second reset transistor T7 are turned off. In this stage, the light emitting element EL does not emit light.

The second stage S2 is referred to as a data writing stage or a threshold compensation stage. The scan signal SCAN provided by the scan line GL is a low-level signal, the first reset control signal RESET1 provided by the first reset control line RST1 and the light emitting control signal EM provided by the light emitting control line EML are both high-level signals, and the data line DL outputs the data signal DATA. In this stage, the first capacitor plate of the storage capacitor Cst is at a low level, thus the drive transistor T3 is turned on. The scan signal SCAN is the low-level signal, so that the threshold compensation transistor T2, the data writing transistor T4, and the second reset transistor T7 are turned on. The threshold compensation transistor T2 and the data writing transistor T4 are turned on, so that a data voltage Vdata output by the data line DL is provided to the first node N1 through the second node N2, the turned-on drive transistor T3, the third node N3, and the turned-on threshold compensation transistor T2, and the storage capacitor Cst is charged with a difference between the data voltage Vdata output by the data line DL and a threshold voltage of the drive transistor T3. A voltage of the first capacitor plate (that is, the first node N1) of the storage capacitor Cst is Vdata−|Vth|, Vdata is the data voltage output by the data line DL, and Vth is the threshold voltage of the drive transistor T3. The second reset transistor T7 is turned on, so that the second initial signal provided by the second initial signal line INIT2 is provided to the anode of the light emitting element EL to initialize (reset) the anode of the light emitting element EL and clear a pre-stored voltage therein, thus completing initialization and ensuring that the light emitting element EL does not emit light. The first reset control signal RESET1 provided by the first reset control line RST1 is a high-level signal, so that the first reset transistor T1 is turned off. The light emitting control signal EM provided by the light emitting control signal line EML is a high-level signal, so that the first light emitting control transistor T5 and the second light emitting control transistor T6 are turned off.

The third stage S3 is referred to as a light emitting stage. The light emitting control signal EM provided by the light emitting control signal line EML is a low-level signal, and the scan signal SCAN provided by the scan line GL and the first reset control signal RESET1 provided by the first reset control line RST1 are high-level signals. The light emitting control signal EM provided by the light emitting control signal line EML is the low-level signal, so that the first light emitting control transistor T5 and the second light emitting control transistor T6 are turned on, and the first voltage signal VDD output by the first power supply line PL1 provides the drive voltage to the anode of the light emitting element EL through the turned-on first light emitting control transistor T5, the drive transistor T3, and the second light emitting control transistor T6 to drive the light emitting element EL to emit light.

In a drive process of the pixel driving circuit, the drive current flowing through the drive transistor T3 is determined by a voltage difference between the gate and the first electrode of the drive transistor T3. Since the voltage of the first node N1 is Vdata−|Vth|, the drive current of the drive transistor T3 is as follows:

$$I=K\times(Vgs-Vth)2=K\times[(VDD-V\text{data}+|Vth|)-Vth]2=K\times[VDD-V\text{data}]2.$$

Where I is the drive current flowing through the drive transistor T3, that is, the drive current for driving the light emitting element EL; K is a constant; Vgs is the voltage difference between the gate and the first electrode of the drive transistor T3; Vth is the threshold voltage of the drive transistor T3; Vdata is the data voltage output by the data line DL; and VDD is the first voltage signal output by the first power supply line PL1.

It may be seen from the above formula that the current flowing through the light emitting element EL has nothing to do with the threshold voltage of the drive transistor T3. Therefore, the pixel driving circuit of the embodiment may better compensate the threshold voltage of the drive transistor T3.

Figure 4:
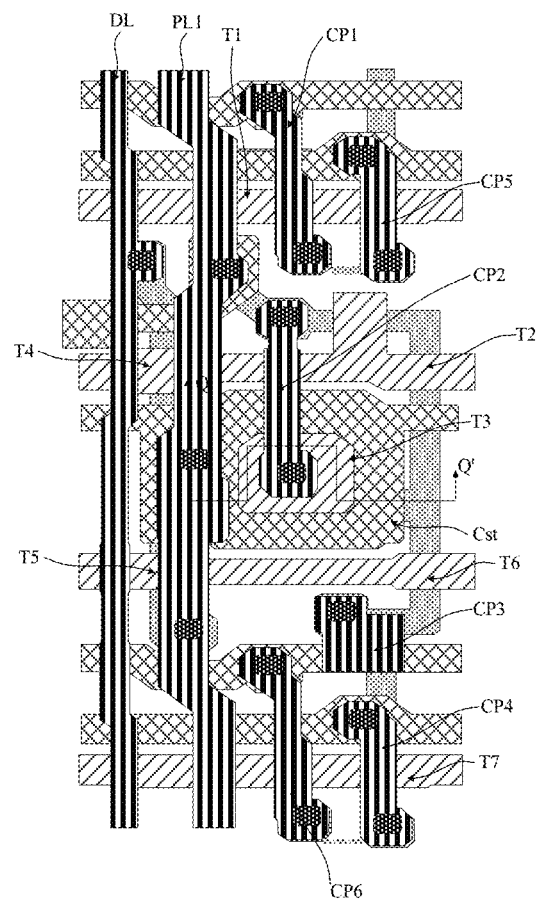
FIG. 4 is a schematic top view of a pixel driving circuit according to an embodiment of the present disclosure.
Figure 5:
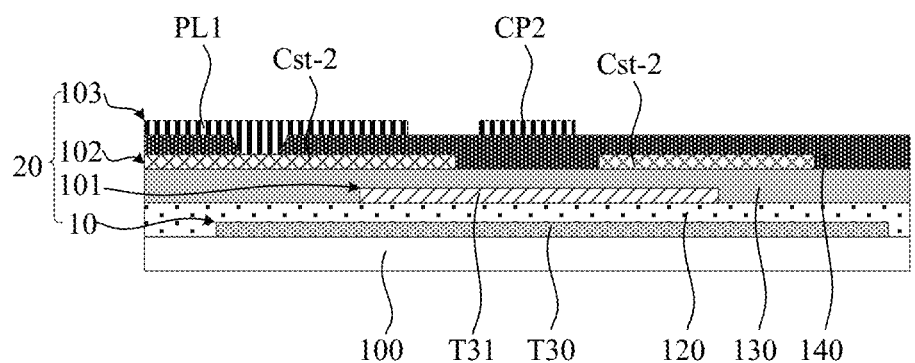
FIG. 5 is a partial cross-sectional schematic diagram along a Q-Q' direction in FIG. 4.
Figure 6A:
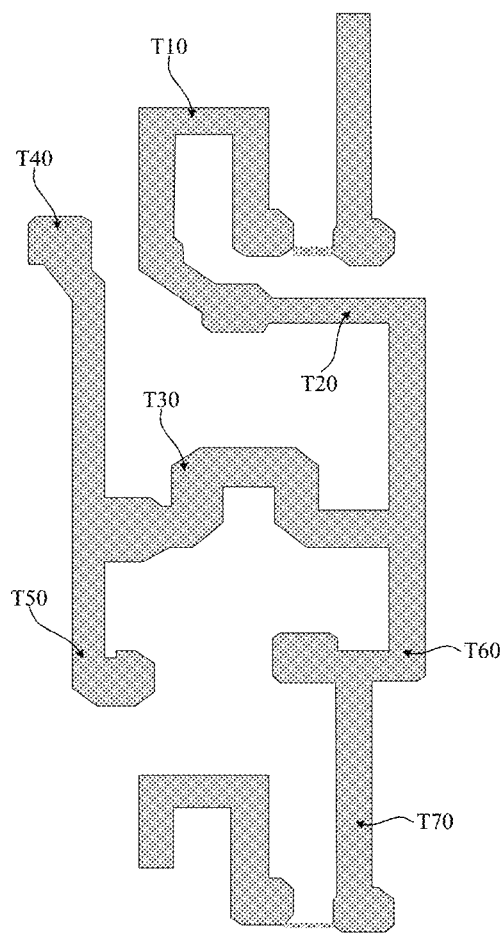
FIG. 6A is a top view of the pixel driving circuit after a semiconductor layer is formed in FIG. 4.
Figure 6B:
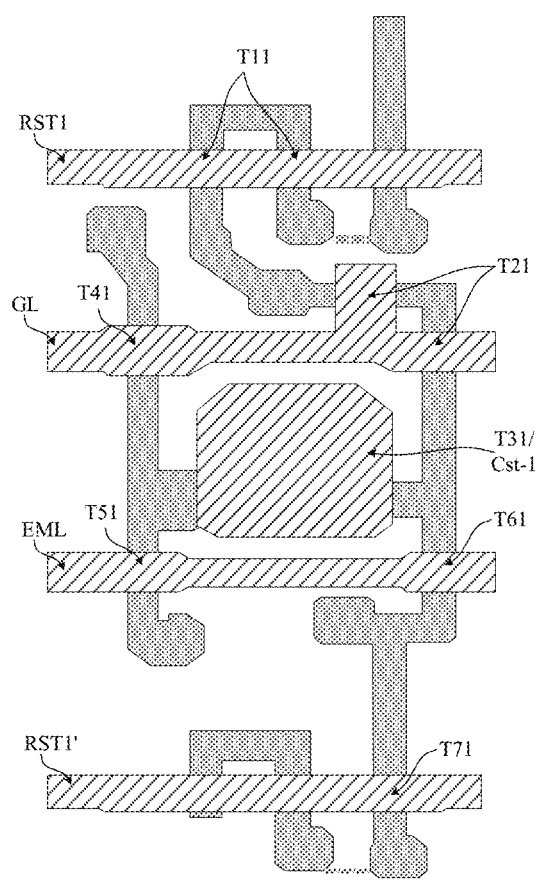
FIG. 6B is a top view of the pixel driving circuit after a first conductive layer is formed in FIG. 4.
Figure 6C:
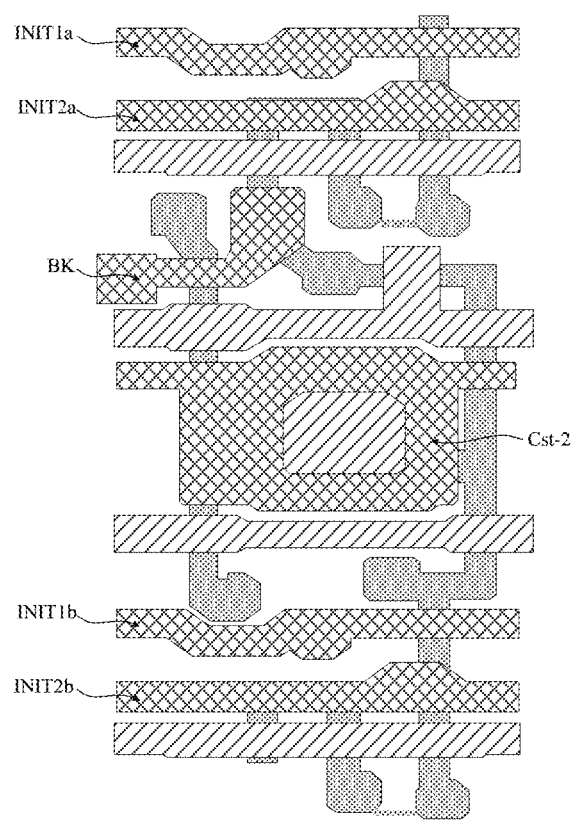
FIG. 6C is a top view of the pixel driving circuit after a second conductive layer is formed in FIG. 4.
Figure 6D:
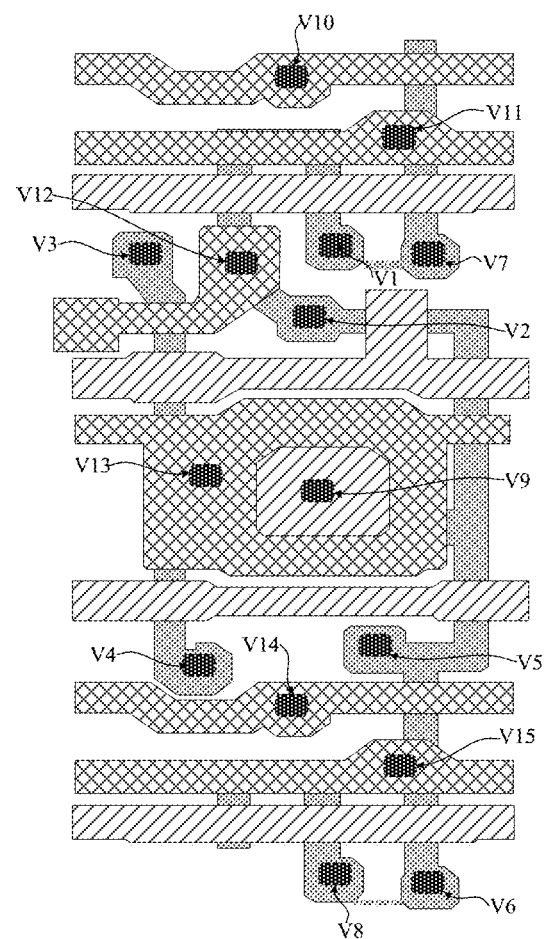
FIG. 6D is a top view of the pixel driving circuit after an interlayer insulation layer is formed in FIG. 4.

FIG. 4 is a schematic top view of a pixel driving circuit according to an embodiment of the present disclosure. FIG. 5 is a partial cross-sectional schematic diagram along a Q-Q' direction in FIG. 4. FIG. 6A is a top view of the pixel driving circuit after a semiconductor layer is formed in FIG. 4. FIG. 6B is a top view of the pixel driving circuit after a first conductive layer is formed in FIG. 4. FIG. 6C is a top view of the pixel driving circuit after a second conductive layer is formed in FIG. 4. FIG. 6D is a top view of the pixel driving circuit after an interlayer insulation layer is formed in FIG. 4.

In some exemplary embodiments, as shown in FIG. 4 to FIG. 6D, the display panel may include a base substrate 100, and a semiconductor layer 10, a first conductive layer 101, a second conductive layer 102, and a third conductive layer 103 which are disposed sequentially on the base substrate 100. A first gate insulation layer 120 is disposed between the semiconductor layer 10 and the first conductive layer 101, a second gate insulation layer 130 is disposed between the first conductive layer 101 and the second conductive layer 102, and an interlayer insulation layer 140 is disposed between the second conductive layer 102 and the third conductive layer 103. The first gate insulation layer 120, the second gate insulation layer 130, and the interlayer insulation layer 140 may be inorganic insulation layers. An anode layer, a pixel definition layer, an organic light emitting layer, and a cathode layer may be disposed sequentially on a side of the third conductive layer 103 away from the base substrate 100. However, the present disclosure is not limited thereto.

In some exemplary embodiments, as shown in FIG. 4 to FIG. 6A, the semiconductor layer 10 of the display panel may include active layers of the plurality of transistors of the pixel driving circuit (for example, a first active layer T10 of the first reset transistor T1, a second active layer T20 of the threshold compensation transistor T2, a third active layer T30 of the drive transistor T3, a fourth active layer T40 of the data writing transistor T4, a fifth active layer T50 of the first light emitting control transistor T5, a sixth active layer T60 of the second light emitting control transistor T6, and a seventh active layer T70 of the second reset transistor T7). Active layers of the plurality of transistors of the pixel driving circuit may be of an integral structure. At least one active layer may include a channel region, a first doped region, and a second doped region. The channel region may not be doped with an impurity and may have characteristics of a semiconductor. The first doped region and the second doped region may be located on two sides of the channel region and are doped with impurity particles, and may thus have conductivity. The impurity may vary according to a type of a transistor. The first doped region or the second doped region of the semiconductor layer may be interpreted as a source electrode or a drain electrode of the transistor.

In some exemplary embodiments, as shown in FIG. 4 to FIG. 6B, the first conductive layer 101 of the display panel may include: control electrodes of the plurality of transistors of the pixel driving circuit (e.g., a control electrode T11 of the first reset transistor T1, a control electrode T21 of the threshold compensation transistor T2, a control electrode T31 of the drive transistor T3, a control electrode T41 of the data writing transistor T4, a control electrode T51 of the first light emitting control transistor T5, a control electrode T61 of the second light emitting control transistor T6, and a control electrode T71 of the second reset transistor T7), the light emitting control line EML, the scan line GL, the first reset control line (including the first reset control line RST1 electrically connected to the pixel driving circuit of the present row and the first reset control line RST1' electrically connected to the pixel driving circuit of a latter row) and a first electrode Cst-1 of the storage capacitor Cst. Among them, the control electrode T11 of the first reset transistor T1 of the pixel driving circuit of the present row, the control electrode of the second reset transistor of the pixel driving circuit of a previous row, and the first reset control line RST1 may be of an integral structure. The control electrode T21 of the threshold compensation transistor T2, the control electrode T41 of the data writing transistor T4, and the scan line GL may be of an integral structure. The control electrode T31 of the drive transistor T3 and the first electrode Cst-1 of the storage capacitor Cst may be of an integral structure. The control electrode T51 of the first light emitting control transistor T5, the control electrode T61 of the second light emitting control transistor T6, and the light emitting control line EML may be of an integral structure. The control electrode T71 of the second reset transistor T7 of the pixel driving circuit of the present row, the control electrode of the first reset transistor of the pixel driving circuit of the latter row, and the first reset control line RST1' may be of an integral structure. However, the present disclosure is not limited thereto.

In some exemplary embodiments, as shown in FIG. 4 to FIG. 6C, the second conductive layer 102 of the display panel may include: the first initial signal line (for example, a first initial signal line INIT1a and a first initial signal line INIT1b), the second initial signal line (for example, a second initial signal line INIT2a and a second initial signal line INIT2b), a second electrode Cst-2 of the storage capacitor Cst and a block electrode BK. The second electrode Cst-2 of the storage capacitor Cst has a hollow region. An orthographic projection of the control electrode T31 of the drive transistor T3 on the base substrate may cover an orthographic projection of the hollow region on the base substrate. The orthographic projection of the hollow region on the base substrate may be in a shape of a polygon. However, the present disclosure is not limited thereto.

In some exemplary embodiments, as shown in FIG. 4 to FIG. 6D, the interlayer insulation layer 140 of the display panel is provided with a plurality of vias, which include, for example, a first via V1 to a fifteenth via V15. The interlayer insulation layer 140, the second gate insulation layer 130, and the first gate insulation layer 120 in the first via V1 to the eighth via V8 are removed to expose a surface of the semiconductor layer 10. The interlayer insulation layer 140 and the second gate insulation layer 130 in the ninth via V9 are removed to expose a surface of the first conductive layer 101. The interlayer insulation layer 140 in the tenth via V10 to the fifteenth via V15 is removed to expose a surface of the second conductive layer 102.

In some exemplary embodiments, as shown in FIG. 4 to FIG. 6D, the third conductive layer 103 of the display panel may include the data line DL, the first power supply line PL1, and a plurality of connection electrodes (for example, a first connection electrode CP1 to a sixth connection electrode CP6). The data line DL may be connected to a first doped region of the active layer T40 of the data writing transistor T4 through the third via V3. The first power supply line PL1 may be electrically connected to the block electrode BK through the twelfth via V12, and may also be electrically connected to the second electrode Cst-2 of the storage capacitor Cst through the thirteenth via V13. The block electrode BK is configured to block an influence of data voltage jump on a key node, avoid an influence of the data voltage jump on a potential of the key node of the pixel driving circuit, and improve a display effect. The first connection electrode CP1 may be electrically connected to a first doped region of the active layer T10 of the first reset transistor T1 through the first via V1, and may also be electrically connected to the first initial signal line INIT1a through the tenth via V10. The second connection electrode CP2 may be electrically connected to a first doped region of the active layer T20 of the threshold compensation transistor T2 through the second via V2, and may also be electrically connected to the control electrode T31 of the drive transistor T3 through the ninth via V9. The third connection electrode CP3 may be electrically connected to a second doped region of the active layer T60 of the second light emitting control transistor T6 through the fifth via V5. The fourth connection electrode CP4 may be electrically connected to a first doped region of an active layer T70 of the second reset transistor T7 through the sixth via V6, and may also be electrically connected to the second initial signal line INIT2b through the fifteenth via V15. The fifth connection electrode CP5 may be electrically connected to a first doped region of the active layer of the second reset transistor of the pixel driving circuit of a previous row through the seventh via V7, and may also be electrically connected to the second initial signal line INIT2a through the eleventh via V11. The sixth connection electrode CP6 may be electrically connected to a first doped region of the active layer of the first reset transistor of the pixel driving circuit of a latter row through the eighth via V8, and may also be electrically connected to the first initial signal line INIT1b through the fourteenth via V14.

The above is only an example of the top view of the pixel driving circuit. However, the present disclosure is not limited thereto.

Figure 7:
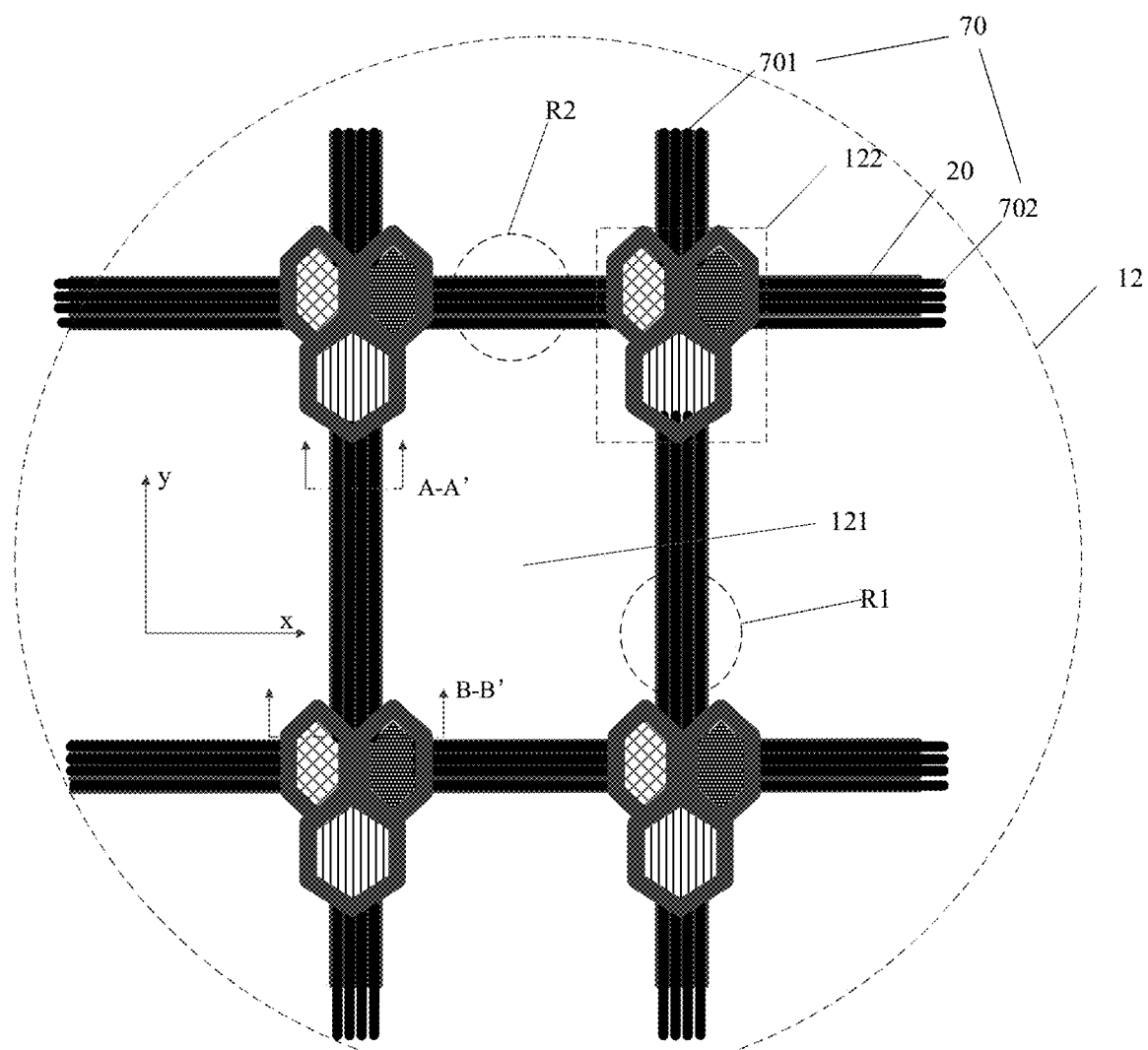
FIG. 7 is a schematic partial structural diagram of a second display region according to an embodiment of the present disclosure.

FIG. 7 is a schematic partial structural diagram of a second display region according to an embodiment of the present disclosure.

As shown in FIG. 7, the second display region 12 includes a plurality of light transmitting regions 121 and a plurality of pixel cell regions 122. There are four pixel cell regions 122 around each light transmitting region 121. Light is transmitted to a sensor (for example, a camera) of the display panel through the light transmitting region 121, and the sensor receives the light, thereby realizing the camera function. At the same time, the pixel cell regions 122 are provided around the light transmitting region 121, the pixel cell region 122 is provided with a pixel cell, and the pixel cell includes a plurality of sub-pixels. For example, each pixel cell includes a red sub-pixel (R), a green sub-pixel (G) and a blue sub-pixel (B). The pixel cell region 122 enables the second display region to realize the display function. By combining the imaging function and the display function in the second display region, a screen-to-body ratio of the display screen is effectively improved.

According to embodiment of the present disclosure, the density of sub-pixels in the first display region 11 is greater than the density of sub-pixels in the second display region 12, that is, the number of sub-pixels per unit area in the first display region 11 is greater than the number of sub-pixels per unit area in the second display region 12, or the total area of the sub-pixels per unit area in the first display region 11 is greater than the total area of sub-pixels per unit area in the second display region 12. In this case, a total area of light transmitting regions per unit area in the first display region 11 is smaller than a total area of light transmitting regions per unit area in the second display region 12, that is, a light transmittance of the first display region 11 is smaller than a light transmittance of the second display region 12.

Figure 8:
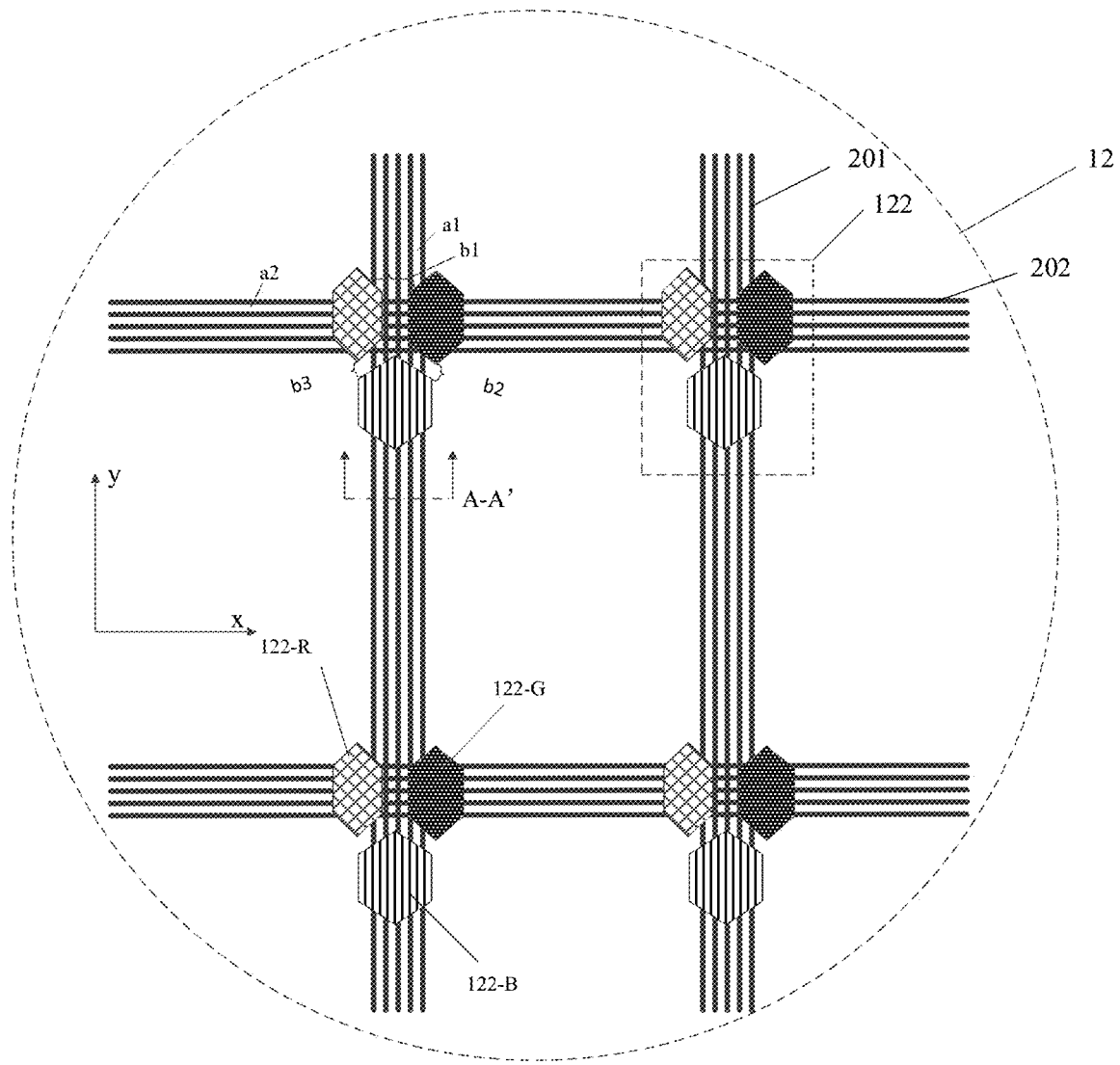
FIG. 8 is a schematic diagram of slits in a second display region according to an embodiment of the present disclosure

In order to realize the combination of the imaging function and the display function in the second display region, the display panel is provided with a pixel driving circuit layer including a multi-layer structure. Corresponding pixel driving circuit traces are provided between adjacent pixel cell regions, and there are slits between these pixel driving circuit traces. In particular, for the second display region (camera region), low PPI should be guaranteed to ensure high light transmittance. However, there are narrow slits between the pixel driving circuit traces, which may lead to interference and diffraction problems when incident light enters the display panel, thereby influencing an imaging quality of the second display region. For example, as shown in FIG. 8, a plurality of first traces 201 extending in a first direction y are provided in the above-mentioned third conductive layer 103, the first trace may be the data line, the power supply line, etc., and the first trace 201 is used to connect the sub-pixels in the pixel cell regions adjacent in the first direction y. A plurality of second traces 202 extending in a second direction x are provided in the above-mentioned first conductive layer 101, the second trace may be the scan line, the light emitting control signal line, etc., and the second trace 202 is used to connect the sub-pixels in the pixel cell regions adjacent in the second direction x. The first direction y intersects with the second direction x. For example, the first direction y is perpendicular to the second direction x. Referring to FIG. 2, FIG. 4-FIG. 6D, the first trace 201 or the second trace 202 may be a signal line along the first direction y or the second direction x in the pixel driving circuit. For example, the first trace 201 or the second trace 202 are selected from the signal lines GL/EML/RST1/RST2/INIT1/INIT2/DL/VDD. According to the embodiment of the present disclosure, a signal transmitted by the first trace 201 may be different from a signal transmitted by the second trace 202. For example, the first trace 201 is selected from the signal lines GL/EML/RST1/RST2/INIT1/INIT2 along the first direction y, and the second trace 202 is selected from the signal lines DL/VDD along the second direction x. It should be noted that the above description are for illustrative purpose only, and is not intended for limitation.

In the embodiment of the present disclosure, in order to avoid the interference and diffraction problems caused by the slits and the resulted poor imaging quality of the second display region, when preparing a touch function layer 70, the touch function layer 70 is used to block the slits. The touch function layer effectively blocks light from entering the second display region through the slits, thereby improving the imaging quality of the second display region.

FIG. 8 shows that a first slit a1 exists between two adjacent first traces 201, and a second slit a2 exists between two adjacent second traces 202. As shown in FIG. 8, the slits between the first traces 201 or the second traces 202 provided between two pixel cell regions 122 may cause the interference and diffraction problems when external light passes the slits, thereby affecting the imaging effect of the second display region.

In order to solve this problem, the embodiment of the present disclosure uses the touch function layer 70 to block the first slit a1 and the second slit a2, so as to obtain a blocking relationship as shown in FIG. 7. During a winding design process, a position of touch electrodes in the touch function layer 70 may be adjusted according to a width (that is, a trace spacing) between the pixel driving circuit traces of the pixel driving circuit layer 20, or the trace spacing between the pixel driving circuit traces may be adjusted according to the position of the touch electrodes in the touch function layer 70.

FIG. 8 further shows that each pixel cell region 122 of the display panel 1 includes a plurality of sub-pixel regions, such as a first sub-pixel region, a second sub-pixel region, and a third sub-pixel region. The first sub-pixel region is provided with a first sub-pixel 122-R, the second sub-pixel region is provided with a second sub-pixel 122-G, and the third sub-pixel region is provided with a third sub-pixel 122-B, and there are slits between adjacent sub-pixels. As shown in FIG. 8, a slit among the first sub-pixel 122-R, the second sub-pixel 122-G, and the third sub-pixel 122-B is a third slit. The third slit may include three sub-slits b1, b2 and b3. The first sub-slit b1 is located between the first sub-pixel 122-R and the second sub-pixel 122-G, the second sub-slit b2 is located between the second sub-pixel 122-G and the third sub-pixel 122-B, and the third sub-slit b3 is located between the third sub-pixel 122-B and the first sub-pixel 122-R.

When the touch function layer 70 winds along the first direction y, it avoids blocking the sub-pixels by bypassing the first sub-pixel 122-R, the second sub-pixel 122-G, and the third sub-pixel 122-B. Furthermore, when the touch function layer 70 winds along the second direction x, it also avoids blocking the sub-pixels by bypassing the first sub-pixel 122-R, the second sub-pixel 122-G, and the third sub-pixel 122-B. Shapes of the sub-pixels are characterized by shapes of light emitting regions of light emitting elements in various sub-pixels. As described below with reference to FIG. 17, the shapes of the light emitting elements in the sub-pixels correspond to opening regions of the pixel definition layer (PDL). In the embodiment shown in FIG. 8, the light emitting regions have hexagonal shapes. Therefore, hexagonal windings appear around the sub-pixels. However, it should be noted that the present disclosure does not limit the shape of the light emitting region, as long as the winding of the touch function layer 70 does not cover the light emitting region, and a specific way to bypass the light emitting regions may also be set according to actual winding needs.

A winding manner of the touch function layer 70 will be described below with reference to FIG. 9-FIG. 11.

Figure 9:
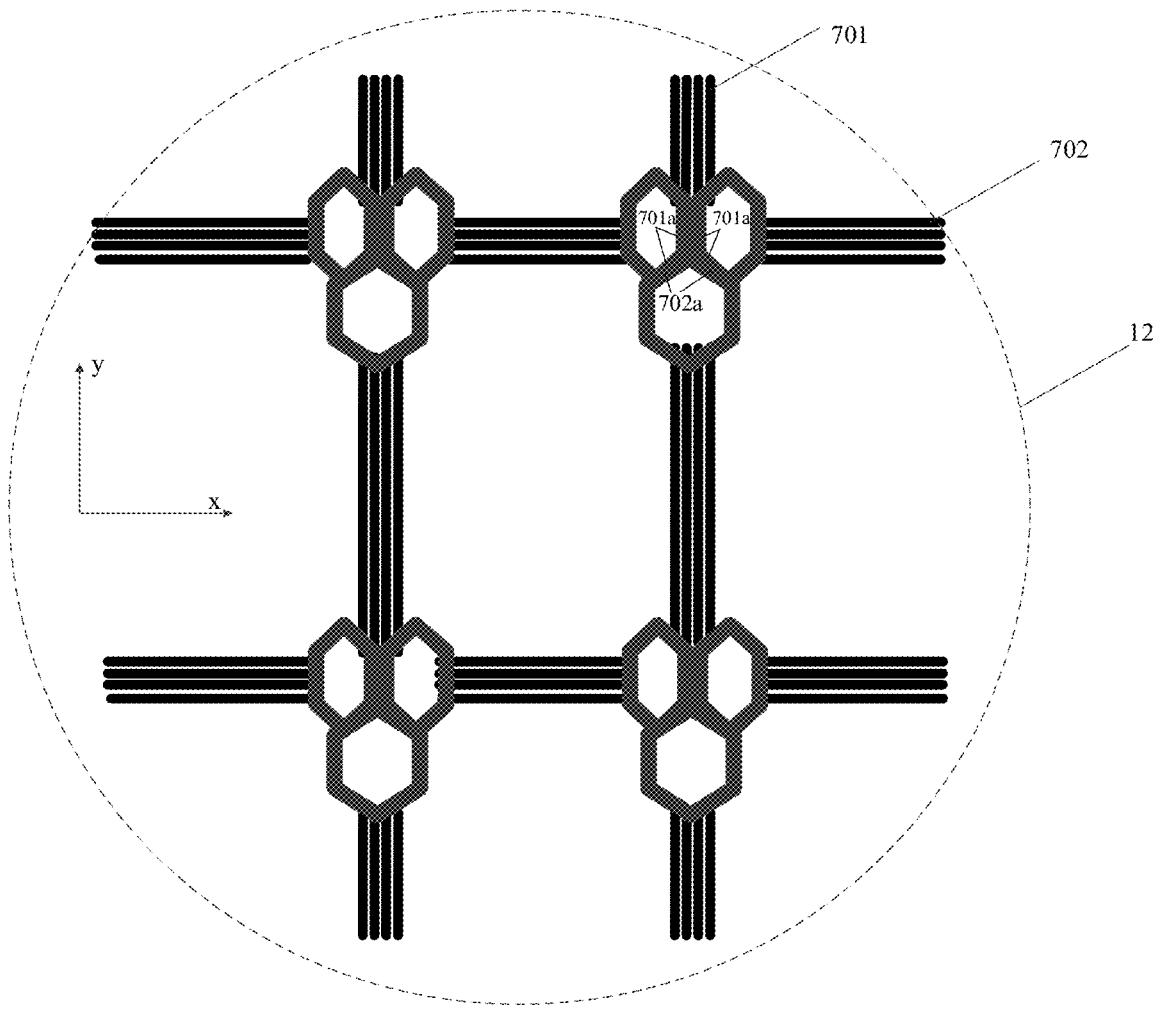
FIG. 9 is a schematic diagram of a wiring manner of a touch function layer according to an embodiment of the present disclosure.

As shown in FIG. 9, The touch function layer 70 includes a plurality of first touch electrodes 701 extending along the first direction y, and a plurality of second touch electrodes 702 extending along the second direction x. In order to avoid the plurality of sub-pixels mentioned above, the first touch electrodes 701 may form three types of winding. As shown in FIG. 9, the first type of winding is that the first touch electrode 701 winds along a left edge of the sub-pixel, such as the first sub-pixel 122-R, and then continues to extend along the first direction y; the second type of winding is that the first touch electrode 701 winds along a right edge of the second sub-pixel 122-G, and then continues to extend along the first direction y; the third type of winding is that the first touch electrode 701 passes through the first sub-slit b1 and the second sub-slit b2 in sequence, and/or passes through the first sub-slit b1 and the third sub-slit b3 in sequence, and then continues to extend along the first direction y. The third type of winding of the first touch electrode 701 may be used to block the slit among the sub-pixels 122-R, 122-G, and 122-B, which is also referred to as a first winding 701a of the first touch electrode 701.

Figure 10:
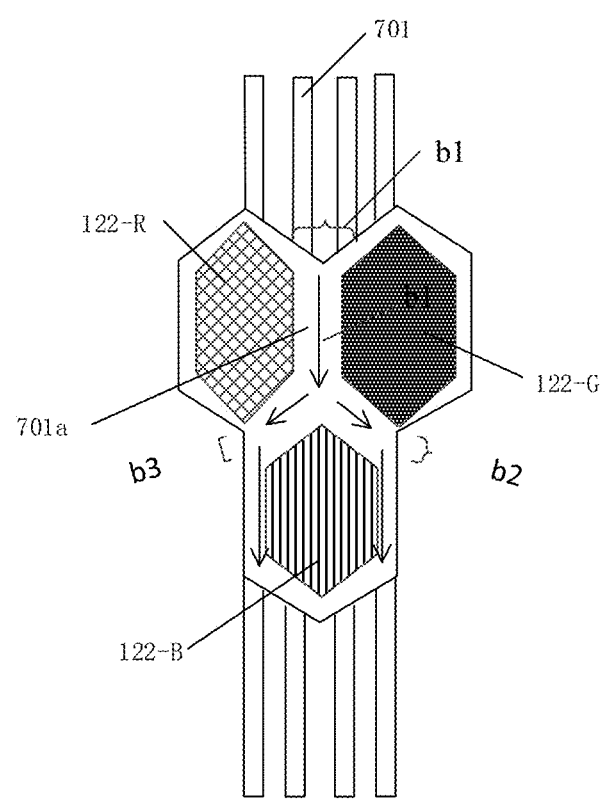
FIG. 10 is a schematic diagram of a first wiring of a touch function layer according to an embodiment of the present disclosure.

FIG. 10 is a schematic diagram of the first winding 701a of the touch function layer 70 according to the embodiment of the present disclosure. As shown in FIG. 10, the first touch electrode 701 of the touch function layer 70 sequentially passes through the first sub-slit b1 between the first sub-pixel 122-R and the second sub-pixel 122-G and the second sub-slit b2 between the second sub-pixel 122-G and the third sub-pixel 122-B, or the first touch electrode 701 sequentially passes through the first sub-slit b1 between the first sub-pixel 122-R and the second sub-pixel 122-G and the third sub-slit b3 between the first sub-pixel 122-R and the third sub-pixel 122-B, so as to form the first winding 701a. That is, the first touch electrode 701 winds at least partially around the edges of the first sub-pixel 122-R and the second sub-pixel 122-G.

Returning back to FIG. 9, in order to avoid the plurality of sub-pixels mentioned above, the second touch electrode 702 may also form three types of winding. As shown in FIG. 9, a first type of winding is that the second touch electrode 702 winds along an upper edge of the sub-pixel, such as the first sub-pixel 122-R, and then continues to extend along the second direction x; the second type of winding is that the touch electrode 702 winds along a lower edge of the sub-pixel, such as the third sub-pixel 122-B, and then continue to extend along the second direction x; the third type of winding is that the second touch electrode 702 sequentially passes through the third sub-slit b3 and the second sub-slit b2, and then continues to extend along the second direction x. The third type of winding of the second touch electrode 702 may be used to block the slit among the sub-pixels 122-R, 122-G, and 122-B, and is also referred to as a second winding 702a of the second touch electrode 702.

Figure 11:
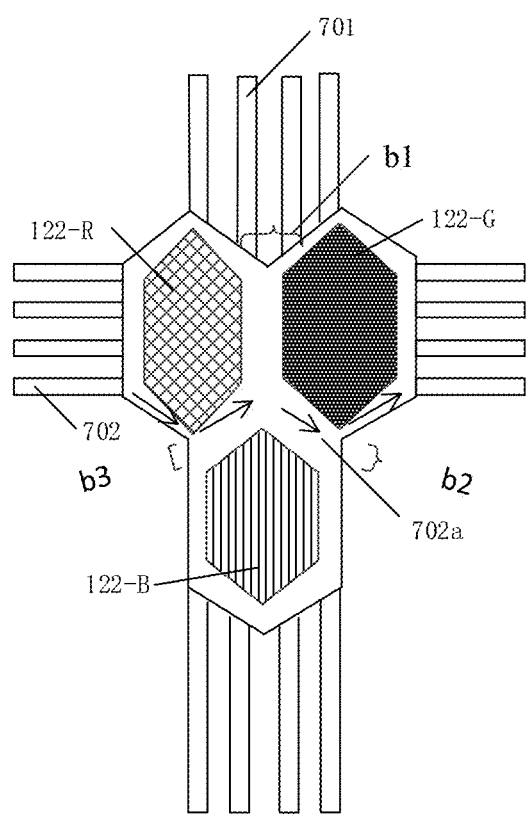
FIG. 11 is a schematic diagram of a second wiring of a touch function layer according to an embodiment of the present disclosure.

FIG. 11 is a schematic diagram of the second winding 702a of the touch function layer 70 according to the embodiment of the present disclosure. As shown in FIG. 11, the second touch electrode 702 of the touch function layer 70 sequentially passes through the third sub-slit b3 between the first sub-pixel 122-R and the third sub-pixel 122-B and the second sub-slit b2 between the second sub-pixel 122-G and the third sub-pixel 122-B, so as to form the second winding line 702a. That is, the second touch electrode 702 winds at least partially around the edge of the third sub-pixel 122-B.

The winding used to block the third slit may include the first winding 701a of the first touch electrode 701 and the second winding 702a of the second touch electrode 702. An orthographic projection of the first winding 701a on the base substrate 100 covers an orthographic projection of the third slit on the base substrate 100, thereby blocking the third slit between adjacent sub-pixels.

Alternatively, the orthographic projection of the first winding 701a on the base substrate 100 covers orthographic projections of a part of sub-slits in the plurality of sub-slits on the base substrate, while the orthographic projection of the second winding 702a on the base substrate 100 covers orthographic projections of the rest sub-slits in the plurality of sub-slits on the base substrate.

In the embodiment of the present disclosure, the first touch electrode 701 of the touch function layer 70 may wind at least partially along the edges of the plurality of sub-pixels 122-R, 122-G, and 122-B mentioned above, while the second touch electrode 702 of the touch function layer 70 may wind along the remaining edges of the plurality of sub-pixels 122-R, 122-G, and 122-B mentioned above. For example, the first touch electrode winds at least partially along the edge of the first sub-pixel 122-R, while the second touch electrode 702 winds at least partially along the edges of the second sub-pixel 122-G and the third sub-pixel 122-B. For example, the first touch electrode winds at least partially along the edge of the second sub-pixel 122-G, while the second touch electrode 702 winds at least partially along the edges of the first sub-pixel 122-R and the third sub-pixel 122-B. For example, the first touch electrode winds at least partially along the edge of the third sub-pixel 122-B, while the second touch electrode 702 winds at least partially along the edges of the first sub-pixel 122-R and the second sub-pixel 122-G. For example, the first touch electrode 701 winds at least partially along the edges of the first sub-pixel 122-R and the second sub-pixel 122-G, while the second touch electrode 702 winds at least partially along the edge of the third sub-pixel 122-B.

It should be noted that the first touch electrode 701 or the second touch electrode 702 may individually wind around the edges of all the sub-pixels. For example, the first touch electrode 701 winds along the edges of the first sub-pixel 122-R, the second-sub-pixel 122-G, and the-third sub-pixel 122-B. Alternatively, the second touch electrode 702 winds along the edges of the first sub-pixel 122-R, the second sub-pixel 122-G, and the third sub-pixel 122-B.

Figure 12:
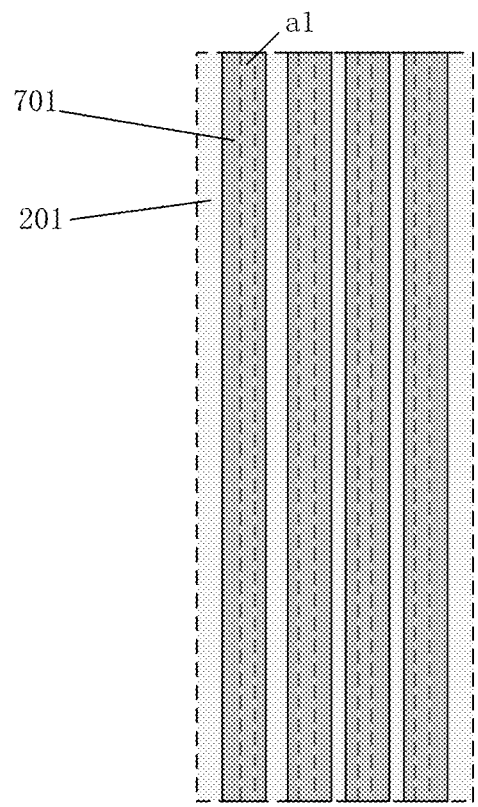
FIG. 12 is an enlarged schematic diagram of a region R1 shown in FIG. 7.
Figure 13:
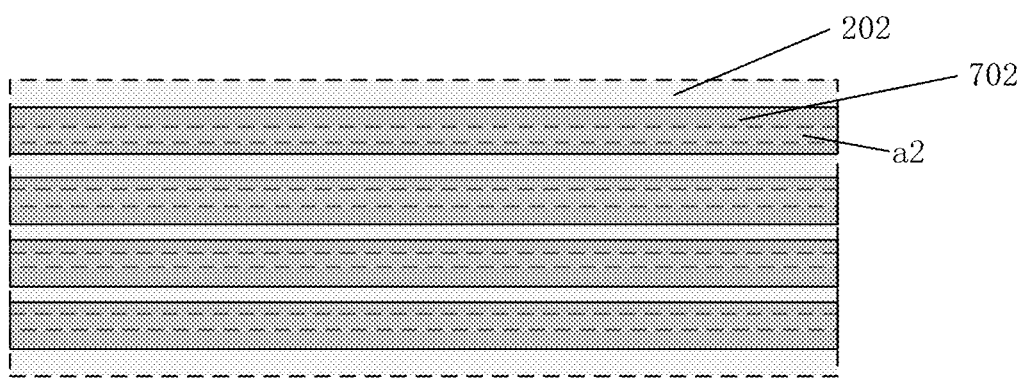
FIG. 13 is an enlarged schematic diagram of a region R2 shown in FIG. 7.

FIG. 12 is an enlarged schematic diagram of region R1 shown in FIG. 7 (i.e., a region between two pixel cell regions 122 adjacent in the first direction y), and FIG. 13 is an enlarged schematic diagram of region R2 in FIG. 7 (i.e., a region between two pixel cell regions 122 adjacent in the second direction x). In the following, a blocking relationship between the touch function layer 70 and the pixel driving circuit layer 20 in the second display region according to the embodiment of the present disclosure will be described with reference to FIG. 12 and FIG. 13.

In FIG. 12, there is a first slit a1 between two adjacent first traces 201 (represented by a dotted box in FIG. 12), and an orthographic projection of the first slit a1 on the base substrate 100 overlaps at least partially with an orthographic projection of first touch electrode 701 (represented by a solid box in FIG. 12) of the touch function layer 70 on the base substrate 100.

In the embodiment of the present disclosure, the orthographic projection of each first touch electrode 701 of the touch function layer 70 covers the orthographic projection of a corresponding first slit a1 on the base substrate 100, and an area of the orthographic projection of each first touch electrode 701 is less than a sum of the orthographic projection of the covered first slit a1 on the base substrate 100 and an area of the orthographic projections of two first traces 201 located on two sides of the covered first slit a1 on the base substrate 100.

In FIG. 13, there is a second slit a2 between two adjacent second traces 202 (represented by a dotted box in FIG. 13), and an orthographic projection of the second slit a2 on the base substrate 100 overlaps at least partially with an orthographic projection of the second touch electrode 702 (represented by a solid box in FIG. 13) of the touch function layer 70 on the base substrate 100.

In the embodiment of the present disclosure, the orthographic projection of each second touch electrode 702 of the touch function layer 70 covers the orthographic projection of a corresponding second slit a2 on the base substrate 100, and an area of the orthographic projection of each second touch electrode 702 is less than a sum of the orthographic projection of the covered second slit a2 on the base substrate 100 and an area of the orthographic projections of two second traces 202 located on two sides of the covered second slit a2 on the base substrate 100.

Figure 14:
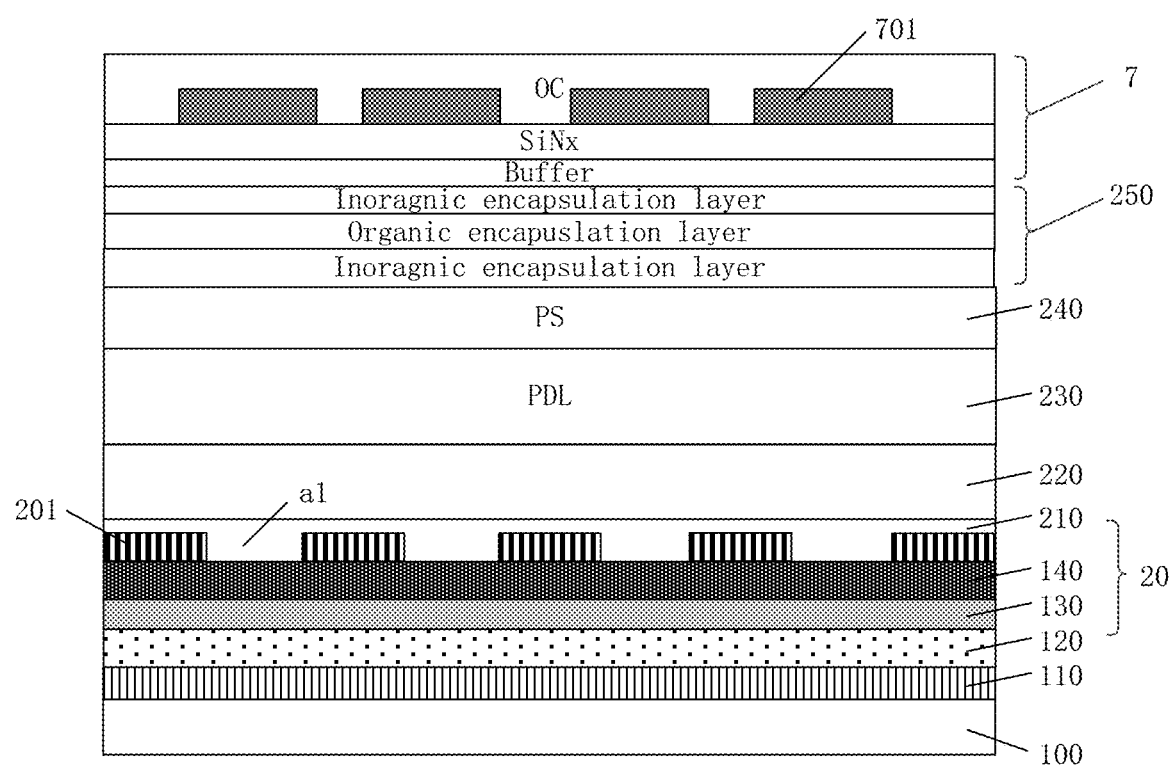
FIG. 14 is a schematic cross-sectional diagram of a display panel according to an embodiment of the present disclosure taken along a line A-A' in FIG. 7.

For a distribution relationship between the touch function layer 70 and other function layers, reference may be made to FIG. 14. FIG. 14 is a schematic cross-sectional view of the display panel according to an embodiment of the present disclosure taken along a line A-A' in FIG. 7. FIG. 4 is a cross-sectional structure of a single sub-pixel region, in which a buffer layer 110, a first gate insulation layer 120, a second gate insulation layer 130, an interlayer insulation layer 140, a passivation layer 210, a first planarization layer 220, a pixel definition layer (PDL) 230, a spacer layer (PS) 240, an encapsulation layer 250 and a touch layer 7 are disposed in sequence on the base substrate 100. The encapsulation layer includes an inorganic encapsulation layer, an organic encapsulation layer and an inorganic encapsulation layer that are sequentially disposed. The touch function layer 70 including the first touch electrode 701 and the second touch electrode 702 is included in the touch layer 7. The touch layer 7 may be FMLOC (Flexible Multiple Layer On Cell). The FMLOC includes, for example, a buffer layer, a SiNx layer and an OC layer that are sequentially disposed. The FMLOC includes the first touch electrodes and the second touch electrodes that are respectively arranged on the display panel in the first direction and the second direction intersecting with each other, thereby realizing a detection of a touch position. The first touch electrodes are emission electrodes, and the second touch electrodes are receiving electrodes. Alternatively, the first touch electrodes are receiving electrodes, and the second touch electrodes are emission electrodes.

As shown in FIG. 14, the first touch electrode 701 is located above the buffer layer and covers the first slit a1 between adjacent first traces 201. However, in other embodiments of the present disclosure, the first touch electrode 701 may also be located between the buffer layer and the SiNx layer and still cover the first slit a1.

According to the embodiment of the present disclosure, the second touch electrode 702 is located above the buffer layer and covers the second slit a2 between adjacent second traces 202. However, in other embodiments of the present disclosure, the second touch electrode 702 may also be located between the buffer layer and the SiNx layer and still cover the second slit a2.

It should be noted that the first touch electrode 701 may be located in a same layer as the second touch electrode 702, or they may be located in different layers. For example, the first touch electrode 701 is located between the OC layer and the SiNx layer, and the second touch electrode 702 is located between the SiNx layer and the buffer layer. Alternatively, the second touch electrode 702 is located between the OC layer and the SiNx layer, and the first touch electrode 701 is located between the SiNx layer and the buffer layer. The present disclosure does not limit the locations of the first touch electrode 701 and the second touch electrode 702.

As shown in FIG. 14, the first trace 201 is located above the interlayer insulation layer. However, according to other embodiments of the present disclosure, the first trace 201 may also be located between the second gate insulation layer 130 and the interlayer insulation layer 140, or may be located on a same layer as a gate G as described below with reference to FIG. 17.

Figure 15:
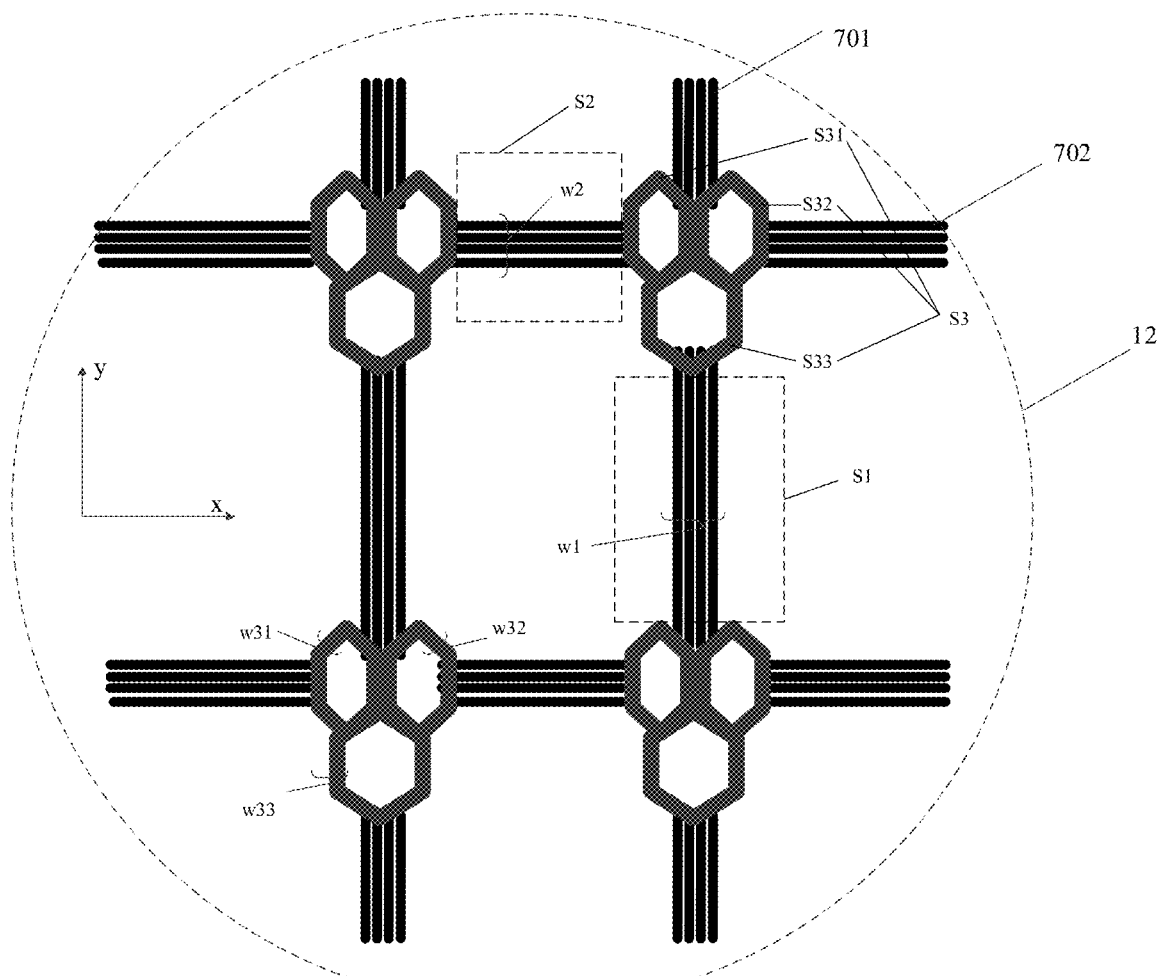
FIG. 15 is a schematic diagram of a touch function layer according to an embodiment of the present disclosure.

On the basis of the above description of the touch function layer with reference to FIG. 9, the present disclosure further provides a solution for dividing a structure of the touch function layer. FIG. 15 is a schematic diagram of the touch function layer according to the embodiment of the present disclosure. As shown in FIG. 15, the touch function layer 70 includes a plurality of first touch structures S1, a plurality of second touch structures S2, and a plurality of third touch structures S3. The first touch structures S1 extend in the first direction y, the second touch structures S2 extend in the second direction x, and the plurality of third touch structures S3 respectively correspond to the plurality of pixel cell regions 122. The third touch structures S3 corresponding to two pixel cell regions 122 adjacent in the first direction y are electrically connected through the first touch structure S1. The third touch structures S3 corresponding to two pixel unit regions 122 adjacent in the second direction x are electrically connected through the second touch structure S2.

The third touch structure S3 includes a plurality of sub-parts S31, S32, and S33, and the sub-parts S31, S32, and S33 of each third touch structure S3 respectively surround the plurality of sub-pixels 122-R, 122-G, and 122-B of the pixel cell region 122 corresponding to the third touch structure. Shapes of the sub-pixels are characterized by shapes of light emitting regions of light emitting elements in various sub-pixels. As described below with reference to FIG. 17, the shapes of the light emitting elements in the sub-pixels correspond to opening regions of the pixel definition layer (PDL). In the embodiment shown in FIG. 15, the light emitting regions have hexagonal shapes. Therefore, sub-parts of the third touch structure S3 having hexagonal shapes appear around the sub-pixels. However, it should be noted that the present disclosure does not limit the shapes of the light emitting regions, as long as the sub-parts of third touch structure S3 of the touch function layer 70 does not cover the light emitting region, and a specific way to bypass the light emitting regions may also be set according to actual winding needs.

The first touch structure S1, the second touch structure S2, and the third touch structure S3 are arranged in a same layer, so that the first touch structure S1, the second touch structure S2, and the third touch structure S3 may be formed through a single process, and a process cost may be saved. Of course, the first touch structure S1, the second touch structure S2, and the third touch structure S3 may also be arranged in different layers, which is not limited by the present disclosure.

A width of the first touch structure S1 in its extension direction, i.e. the first direction y, and a width of the second touch structure S2 in its extension direction, i.e. the second direction x, are both greater than a line width of each grid in the third touch structure S3. That is, the width w1 of the first touch structure S1 in the first direction y and the width w2 of the second touch structure S2 in the second direction x are both greater than line widths w31, w32, and w33 of each sub-part S31, S32, and S33 in the third touch structure S3.

Figure 16:
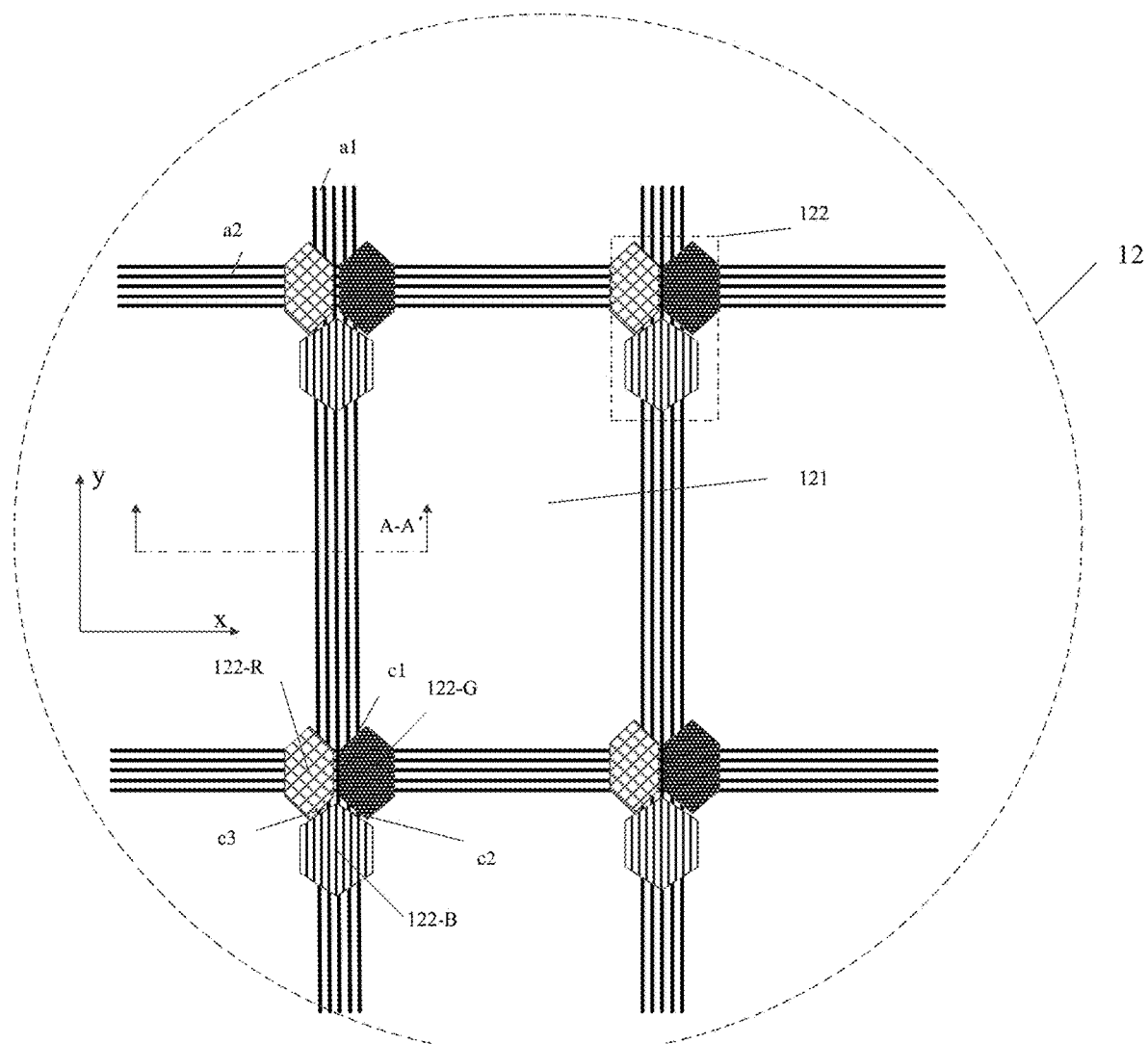
FIG. 16 is a schematic partial structural view of a second display region according to another embodiment of the present disclosure.

Referring to FIG. 16, FIG. 16 is a schematic partial structural view of the second display region according to another embodiment of the present disclosure. By increasing an area of an anode of each sub-pixel, fourth slits exist between adjacent sub-pixels, a width of the fourth slit is smaller than a width of the orthographic projection of the touch function layer on the base substrate. The fourth slit is as shown in FIG. 16, and it includes a sub-slit c1, a sub-slit c2 and a sub-slit c3. The pixel cell region 122 includes a plurality of sub-pixel regions, each sub-pixel region is provided with the corresponding sub-pixel. There are sub-slits with different widths between adjacent sub-pixel regions. Orthographic projections of these sub-slits on the base substrate are smaller than the orthographic projections of the sub-slits as shown in FIG. 8 on the base substrate. For example, the sub-slit c1 is formed by only increasing areas of the sub-pixel 122-R and the sub-pixel 122-G, compared with the sub-slit b1 formed by the sub-pixel region 122-R and the sub-pixel region 122-G as shown in FIG. 8, an orthographic projection of the sub-slit c1 on the base substrate is significantly smaller than that of the sub-slit b1 on the base substrate. The sub-slit c1, the sub-slit c2, and the sub-slit c3 may be formed by simultaneously increasing areas of the sub-pixel 122-R, the sub-pixel 122-G, and the sub-pixel 122-B, and the orthographic projection of each sub-slit on the base substrate is smaller than the orthographic projection of the sub-slit at the corresponding position in FIG. 8 on base substrate.

In the embodiment of the present disclosure, by increasing the area of the anode, the orthographic projection of the plurality of sub-slits included in the fourth slit on the base substrate is reduced, a winding amount of the first touch electrode and the second touch electrode in the sub-slit may be reduced. The width of the touch electrode itself may be directly utilized to block the reduced-sized sub-slit, thereby further saving the process cost and improving a blocking efficiency.

The winding of the first touch electrode and the second touch electrode of the touch function layer around the sub-pixels may better block the plurality of slits among these sub-pixels.

According to the embodiment of the present disclosure, each pixel cell region includes at least one pixel cell, and each pixel cell includes a plurality of sub-pixels of different emission colors. Each sub-pixel includes a light emitting element, and the light emitting element includes an anode, a light emitting layer, and a cathode that are sequentially stacked.

Figure 17:
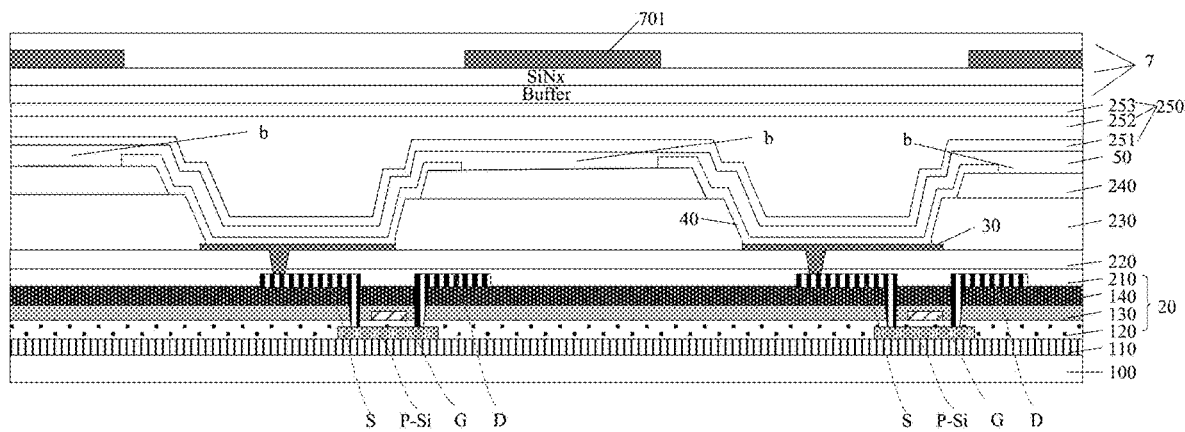
FIG. 17 is a schematic cross-sectional diagram of a display panel according to an embodiment of the present disclosure taken along a line B-B' in FIG. 7.

FIG. 17 is a schematic cross-sectional diagram of the display panel according to the embodiment of the present disclosure taken along a line B-B' in FIG. 7.

As shown in FIG. 17, at least one of the plurality of sub-pixels in the display panel includes a thin film transistor, which has a gate G, a source S, and a drain D. An active layer P-Si of the thin film transistor is located between a buffer layer 110 and a first gate insulation layer 120, and is connected to the source S and drain D. An interlayer insulation layer 140 is located between the source S/drain D and the gate G. The first gate insulation layer 120 is located on a side of the interlayer insulation layer 140 facing the base substrate 100. A second gate insulation layer 130 is located between the interlayer insulation layer 140 and the first gate insulation layer 120.

The sub-pixel may further include a passivation layer 210 and a first planarization layer 220. The passivation layer 210 is located on a side of the interlayer insulation layer 140 away from the base substrate 100. The first planarization layer 220 is located on a side of the passivation layer 210 away from the base substrate 100. The pixel driving circuit layer 20 mentioned above includes at least the first gate insulation layer 120, the second gate insulation layer 130, the interlayer insulation layer 140, and the passivation layer 210.

The sub-pixel may further include a pixel definition layer 230, a spacer layer (PS) 240, and a plurality of light emitting elements. The pixel definition layer 230 is located on a side of the first planarization layer 220 away from the base substrate 100. The spacer layer 240 is located on a side of the pixel definition layer 230 away from the base substrate 100. The light-emitting element includes an anode 30, a light emitting layer 40, and a cathode 50. The anode 30 is located on a side of the first planarization layer 220 away from the base substrate 100. The light emitting layer 40 is located on a side of the anode 30 away from the base substrate 100 and partially covers the anode 30. The cathode 50 is located on a side of the light emitting layer 40 away from the base substrate 100.

The sub-pixel may further include an encapsulation layer 250 located on a side of the cathode 50 away from the base substrate 100. In the embodiment, the encapsulation layer 250 may include a first inorganic encapsulation layer 251, an organic encapsulation layer 252, and a second inorganic encapsulation layer 253 that are sequentially stacked.

The sub-pixel can further include a touch layer 7 located on a side of the second inorganic encapsulation layer 253 away from the base substrate 100. The touch layer 7 includes a buffer layer, a SiNx layer, and an OC layer. The buffer layer is located on a side of the second inorganic encapsulation layer 253 away from the base substrate 100, the SiNx layer is located on a side of the buffer layer away from the base substrate 100, and the OC layer is located on a side of the SiNx layer away from the base substrate 100 for protection. The touch function layer 70 including the first touch electrode 701 and the second touch electrode 702 is included in the touch layer 7.

FIG. 17 further shows a blocking relationship between the touch function layer 70 and other function layers. As shown in FIG. 17, the orthographic projection of the first touch electrode 701 of the touch function layer 70 on the base substrate 100 at least partially covers the orthographic projection of the third slit b on the base substrate 100. The first touch electrode 701 of the touch function layer 70 may effectively block light incident onto the third slit b.

According to the embodiment of the present disclosure, the orthographic projection of the second touch electrode 702 of the touch function layer 70 on the base substrate 100 at least partially covers the orthographic projection of the third slit b on the base substrate 100. The second touch electrode 702 of the touch function layer 70 may effectively block light incident onto the third slit b.

The present disclosure effectively improves the imaging quality of the second display region by blocking the slits between other functional layers through the touch function layer. Compared to the related art that a separate block layer is required to block the slits in different layers that may cause light interference and diffraction problems, the present disclosure effectively blocks the slits in different layers through only one touch function layer, which may effectively save the production process cost and improve the imaging quality of the second display region.

It may be understood that the display panel according to the embodiment of the present disclosure may be a rigid panel or a flexible panel. When the display panel is a flexible panel, the base substrate includes a flexible substrate, which may be made from a flexible organic material, for example, polyimide (PI).

The display panel according to the embodiment of the present disclosure is suitable for a display device that requires a sensor to be placed under the screen. The sensor may be a camera. The display device may be a tablet computer, a mobile phone, or the like.

Further, the embodiment of the present disclosure provides a display device including: the display panel as described in the foregoing embodiments; and a sensor unit disposed in the second display region of the display panel and located on a side of the base substrate away from the pixel. A photosensitive surface of the sensor unit faces the display panel.

Figure 18:
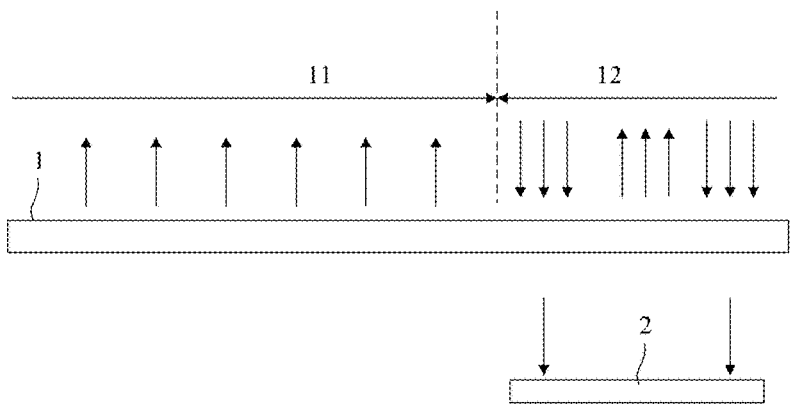
FIG. 18 is a schematic diagram of a display device according to yet another embodiment of the present disclosure.

FIG. 18 is a schematic diagram of a display device according to the yet another embodiment of the present disclosure. As shown in FIG. 18, a display device is provided, including the display panel 1 and a sensor 2 located on an emission side of a light emitting structure layer away from the display panel 1. The sensor 2 is disposed in the second display region 12 of display panel 1, and the sensor 2 may be located on a non-display side of display panel 1. An orthographic projection of the sensor 2 on the display panel 1 may overlap with the first display region 11.

In some exemplary embodiments, the display panel 1 may be a flexible OLED display panel, a QLED display panel, a Micro-LED display panel, or a Mini-LED display panel. The display device may be a product with an image (including a static image or a dynamic image, where the dynamic image may be a video) display function. For example, the display device may be any product of: display, television, billboard, digital photo frame, laser printer with display function, telephone, mobile phone, picture screen, personal digital assistants (PDAs), digital camera, portable camcorder, viewfinder, navigator, vehicle, large area wall, information query apparatus (such as business query apparatuses in departments such as e-government, banking, hospitals, power, etc.), monitor, etc. For example, the display device may also be a micro display, a VR apparatus or AR apparatus including a micro display, or the like.

The display panel of the present disclosure includes: a base substrate includes a first display region and a second display region located at least on a side of the first display region, the second display region includes a plurality of light transmitting regions and a plurality of pixel cell regions, and at least one pixel cell region includes a plurality of sub-pixels; a pixel driving circuit layer located on a side of the base substrate and at least in the second display region, the pixel driving circuit layer includes a pixel driving circuit and a pixel driving circuit trace that are electrically connected, the pixel driving circuit trace includes a plurality of first traces extending in the first direction and a plurality of second traces extending in the second direction intersecting the first direction, and there is a first slit between adjacent first traces and a second slit between adjacent second traces; a plurality of light-emitting elements located in the second display region and on a side of the pixel driving circuit layer away from the base substrate, including sequentially stacked anodes, light-emitting layers, and cathodes; and a touch function layer located on a side of the light-emitting elements away from the base substrate and at least in the second display region, at least one of orthographic projections of the first slit and the second slit on the base substrate at least partially overlaps with an orthographic projection of the touch function layer on the base substrate. The embodiment of the present disclosure covers the orthographic projections of the first slit and the second slit on the base substrate by using the orthographic projection of the touch function layer on the base substrate, so as to cover the slits between the first traces and the slits between the second traces, avoid the interference and diffraction problems caused by the incident light passing the slits, which may effectively improve the imaging quality. Further, the present disclosure uses the touch function layer to block the slits, a single process procedure is used, effectively saving the process cost.

The above description only refers to preferred embodiments of the present disclosure and the explanation of the applied technical principles. Those skilled in the art should understand that the scope of the present disclosure is not limited to the technical solutions formed by the specific combination of the above technical features, but also covers other technical solutions formed by arbitrary combinations of the technical features or equivalent features thereof. For example, the scope of the present disclosure includes (but is not limited to) the technical solutions formed by replacing the above features with the technical features having similar functions disclosed in the present disclosure.

What is claimed is:

1. A display panel, comprising:
   a base substrate, wherein the base substrate comprises a first display region and a second display region located at least on a side of the first display region, the second display region comprises a plurality of light transmitting regions and a plurality of pixel cell regions, and at least one pixel cell region in the plurality of pixel cell regions comprises a plurality of sub-pixels;
   a pixel driving circuit layer located on a side of the base substrate and at least in the second display region, wherein the pixel driving circuit layer comprises a pixel driving circuit and a pixel driving circuit trace electrically connected to the pixel driving circuit, the pixel driving circuit trace includes a plurality of first traces extending in a first direction and a plurality of second traces extending in a second direction intersecting the first direction, and a first slit is between two adjacent first traces and a second slit is between two adjacent second traces;
   a plurality of light-emitting elements located in the second display region and on a side of the pixel driving circuit layer away from the base substrate, and a light-emitting element comprises an anode, a light-emitting layer, and a cathode stacked sequentially;
   a touch function layer located on a side of the plurality of light emitting elements away from the base substrate and at least in the second display region, and at least one of an orthographic projection of the first slit on the base substrate and an orthographic projection of the second slit on the base substrate at least partially overlaps with an orthographic projection of the touch function layer on the base substrate; and
   wherein a density of the sub-pixels in the first display region is greater than a density of the sub-pixels in the second display region.

2. The display panel according to claim 1, wherein the touch function layer comprises a plurality of first touch electrodes extending in the first direction, and a plurality of second touch electrodes extending in the second direction;
   wherein an orthographic projection of a first touch electrode at least partially covers the orthographic projection of the first slit on the base substrate; and
   wherein an orthographic projection of a second touch electrode at least partially covers the orthographic projection of the second slit on the base substrate.

3. The display panel according to claim 2, wherein the first touch electrode winds at least partially around an edge of at least one sub-pixel in the plurality of sub-pixels; or
   wherein the second touch electrode winds at least partially around an edge of at least one sub-pixel in the plurality of sub-pixels.

4. The display panel according to claim 3, wherein the plurality of sub-pixels comprises a first sub-pixel, a second sub-pixel and a third sub-pixel, the first sub-pixel and the second sub-pixel are arranged in the second direction, and the third sub-pixel is located on a side of the first sub-pixel and the second sub-pixel along the first direction.

5. The display panel according to claim 4, wherein the first touch electrode winds at least partially around edges of the first sub-pixel and the second sub-pixel; or
   wherein the first touch electrode winds at least partially around an edge of the third sub-pixel.

6. The display panel according to claim 5, wherein the first touch electrode winds at least partially around the edges of the first sub-pixel and the second sub-pixel, and the second touch electrode winds at least partially around the edge of the third sub-pixel.

7. The display panel according to claim 6, wherein the orthographic projection of the first touch electrode on the base substrate and the orthographic projection of the second touch electrode on the base substrate do not overlap with an orthographic projection of a light emitting region of the light emitting element on the base substrate.

8. The display panel according to claim 1, wherein the orthographic projection of the touch function layer does not overlap with an orthographic projection of the anode on the base substrate.

9. The display panel according to claim 1, wherein a third slit is between adjacent sub-pixels, and
   wherein the orthographic projection of the touch function layer on the base substrate overlaps with an orthographic projection of the third slit on the base substrate.

10. The display panel according to claim 9, wherein the touch function layer comprises a plurality of first touch electrodes extending in the first direction and a plurality of second touch electrodes extending in the second direction, the third slit comprises a first sub-slit, a second sub-slit and a third sub-slit, and each of the first sub-slit, the second sub-slit and the third sub-slit is located between adjacent sub-pixels, wherein the first touch electrode comprises a first winding by winding at least partially around the edges of the first sub-pixel and the second sub-pixel, an orthographic projection of the first winding of the first touch electrode overlaps with orthographic projections of the first sub-slit and the second sub-slit connected to each other on the base substrate, or the orthographic projection of the first winding of the first touch electrode overlaps with orthographic projections of the first sub-slit and the third sub-slit connected to each other on the base substrate; and wherein the second touch electrode comprises a second winding by winding at least partially around the edge of the third sub-pixel, and an orthographic projection of the second winding of the second touch electrode overlaps with orthographic projections of the second sub-slit and the third sub-slit connected to each other on the base substrate.

11. The display panel according to claim 2, wherein the orthographic projection of the first touch electrode on the base substrate covers the orthographic projection of the first slit on the base substrate, and an area of the orthographic projection of the first touch electrode on the base substrate is smaller than a sum of an area of the orthographic projection of the first slit on the base substrate and areas of orthographic projections of two first traces adjacent on two sides of the first slit on the base substrate.

12. The display panel according to claim 2, wherein the orthographic projection of the second touch electrode on the base substrate covers the orthographic projection of the second slit on the base substrate, and an area of the orthographic projection of the second touch electrode on the base substrate is smaller than a sum of an area of the orthographic projection of the second slit on the base substrate and areas of orthographic projections of two second traces adjacent on two sides of the second slit on the base substrate.

13. The display panel according to claim 1, wherein the plurality of first traces are configured to transmit a data signal and a power voltage signal to the plurality of sub-pixels.

14. The display panel according to claim 1, wherein the plurality of second traces are configured to transmit a scan signal and a light emitting control signal to the plurality of sub-pixels.

15. The display panel according to claim 1, wherein a light transmittance of the first display region is smaller than a light transmittance of the second display region.

16. The display panel according to claim 1, wherein the touch function layer comprises a plurality of first touch structures, a plurality of second touch structures, and a plurality of third touch structures;

wherein the plurality of first touch structures extend in the first direction;

wherein the plurality of second touch structures extend in the second direction;

wherein the plurality of third touch structures respectively correspond to the plurality of pixel cell regions, a third touch structure comprises a plurality of sub-parts, the plurality of sub-parts of each third touch structure respectively surround the plurality of sub-pixels in the pixel cell region corresponding to the third touch structure;

wherein the third touch structures corresponding to two pixel cell regions adjacent in the first direction are electrically connected through the first touch structure; and wherein the third touch structures corresponding to two pixel cell regions adjacent in the second direction are electrically connected through the second touch structure.

17. The display panel according to claim 16, wherein the first touch structure, the second touch structure and the third touch structure are located on a same layer.

18. The display panel according to claim 16, wherein a width of the first touch structure in the first direction and a width of the second touch structure in the second direction are greater than a line width of each grid in the third touch structure.

19. A display device, comprising:

the display panel according to claim 1; and a sensor unit arranged in the second display region of the display panel and located on a side of the base substrate facing away from a light emitting direction, wherein a photosensitive surface of the sensor unit faces the display panel.

* * * * *